United States Patent
Bove et al.

(10) Patent No.: US 7,761,844 B2
(45) Date of Patent: Jul. 20, 2010

(54) TECHNIQUE FOR PLATFORM-INDEPENDENT SERVICE MODELING

(75) Inventors: Aniello Bove, Birmensdorf (CH); Hansbeat Loacker, Egg (CH)

(73) Assignee: UBS AG, Zurich (CH)

( * ) Notice: Subject to any disclaimer, the term of this patent is extended or adjusted under 35 U.S.C. 154(b) by 1117 days.

(21) Appl. No.: 11/407,963

(22) Filed: Apr. 21, 2006

(65) Prior Publication Data
US 2006/0242195 A1 Oct. 26, 2006

(30) Foreign Application Priority Data
Apr. 22, 2005 (EP) .................. 05008925

(51) Int. Cl.
*G06F 9/44* (2006.01)
(52) U.S. Cl. .......... 717/106; 717/108; 717/118; 717/136; 717/137; 717/104; 707/829
(58) Field of Classification Search .......... 717/136, 717/137, 106, 104, 108, 118; 707/829
See application file for complete search history.

(56) References Cited

U.S. PATENT DOCUMENTS

| 6,101,500 | A  | * | 8/2000  | Lau ............................. 1/1 |
| 6,199,195 | B1 |   | 3/2001  | Goodwin et al. |
| 6,442,748 | B1 | * | 8/2002  | Bowman-Amuah .......... 717/108 |
| 6,601,234 | B1 | * | 7/2003  | Bowman-Amuah .......... 717/108 |
| 6,615,253 | B1 | * | 9/2003  | Bowman-Amuah .......... 709/219 |
| 6,742,175 | B1 | * | 5/2004  | Brassard ....................... 717/107 |
| 6,862,735 | B1 | * | 3/2005  | Slaughter et al. ............. 719/315 |
| 6,952,817 | B1 | * | 10/2005 | Harris et al. .................... 716/18 |
| 6,957,391 | B2 | * | 10/2005 | Broussard ..................... 715/746 |
| 6,985,905 | B2 | * | 1/2006  | Prompt et al. ...................... 1/1 |
| 7,231,400 | B2 | * | 6/2007  | Cameron et al. ...................... 1/1 |
| 7,340,718 | B2 | * | 3/2008  | Szladovics et al. ........... 717/106 |
| 7,392,483 | B2 | * | 6/2008  | Wong et al. .................. 715/746 |
| 7,418,710 | B1 | * | 8/2008  | Kaspersky et al. ........... 719/313 |
| 7,457,846 | B2 | * | 11/2008 | Baldwin et al. .............. 709/217 |
| 7,490,332 | B2 | * | 2/2009  | Sesma ......................... 719/315 |
| 2002/0023261 | A1 |   | 2/2002 | Goodwin et al. |
| 2003/0074648 | A1 | * | 4/2003 | Brassard et al. .............. 717/104 |
| 2004/0015816 | A1 | * | 1/2004 | Hines et al. .................. 717/101 |
| 2004/0103114 | A1 | * | 5/2004 | Sesma ..................... 707/103 R |
| 2004/0223009 | A1 | * | 11/2004 | Szladovics et al. ........... 345/760 |
| 2006/0206861 | A1 | * | 9/2006 | Shenfield et al. ............. 717/106 |

OTHER PUBLICATIONS

Title: Time weaver: a software-through-models framework for embedded real-time systems, author: Dionisio de Niz et al, Publisher: ACM, publication date: Jul. 2003.*

(Continued)

*Primary Examiner*—Chameli C Das
(74) *Attorney, Agent, or Firm*—Paul, Hastings, Janofsky & Walker LLP

(57) ABSTRACT

A template-driven system for generating platform-specific artifacts, such as program code, from platform-independent service models is described. The system comprises a template storage with platform-specific templates, each template including platform-specific model transformation information; a repository with a plurality of at least essentially platform-independent service model elements and one or more service models modeled from the model elements; and a generator adapted to generate platform-specific artifacts by applying the transformation information included in the templates to the service models.

23 Claims, 47 Drawing Sheets

OTHER PUBLICATIONS

Title: A higher level system communication model for object-oriented specification and design of embedded systems, author: Kieti Svarstad et al, Publisher: ACM, publication date: Jan. 2001.*

David Frankel, John Parodi: "White Paper Using Model-Driven Architecture to Develop Web Services" Internet Article, [Online] Apr. 2002, XP002385064 IONA website; Retrieved from the Internet: URL:http://www.iona.com/archwebservice/WSMDA.pdf> (retrieved on Jun. 13, 2006) *p. iii, paragraph 3*; *p. 2, paragraph 1-p. 3, paragraph 6*; *p. 4, paragraph 2*; *p. 11, last paragraph*; *p. 12, paragraph 1-p. 13, paragraph 1*; p. 14, paragraph 1-paragraph 4*; *p. 1; figure 8*2.

European Search Report dated Sep. 5, 2006.

* cited by examiner

Associated user error messages

ErrorMessages | Mapping

| Mapped to | Software ID | Message ID | Error Type | Severity | Child Service |
|---|---|---|---|---|---|
| | 999 | 10001 | Business | Exception | GetAddressIma... |
| | 999 | 10002 | Technical | Exception | GetAddressIma... |
| | 999 | 10003 | Technical | Exception | GetAddressIma... |
| GAC:60420 | GAC | 40004 | Technical | Exception | GetAddressIma... |
| GAC:60420 | GAC | 40006 | Technical | Exception | GetAddressIma... |
| | GAC | 40007 | Technical | Exception | GetAddressIma... |

Fig. 51

Associated user error messages

ErrorMessages | Mapping

| Software ID | Message ID | Error Type | Severity | Mapped | |
|---|---|---|---|---|---|
| 999 | 10000 | Technical | Exception | | |
| 999 | 30001 | Business | Exception | | |
| 999 | 30008 | Technical | Exception | | |
| GAC | 60420 | Technical | Exception | ✓ | |
| GAC | 60427 | Technical | Exception | | |
| GAC | 60428 | Technical | Exception | | |

Fig. 52

⊟···▭▭▭ Input_GetClientTest_V1_0
    ⊙ d201_nl
    ⊙ d201_nat

Fig. 60

⊟···▭▭▭ Output_GetClientTest_V1_0
    ⊙ d201_nl
    ⊙ d201_kdst
    ⊙ d201_datmut
    ⊙ d201_flagkd2
    ⊙ d201_domzil
    ⊙ d201_nat
    ⊙ d201_branc1
    ⊙ d201_branc2
    ⊙ d201_plz

Fig. 61

TECHNIQUE FOR PLATFORM-INDEPENDENT SERVICE MODELING

The present application claims priority from European Patent Office (EPO) Application Number (05 008 925.9) filed on Apr. 22, 2005, which is incorporated herein by reference it its entirety.

FIELD OF THE INVENTION

The invention generally relates to the field of generating platform-independent service models. More specifically, the invention relates to the generation of platform-independent service models that form the basis for platform-specific physical artifacts.

BACKGROUND OF THE INVENTION

Software development conventionally starts with the creation of a logical model reflecting the functional requirements of the particular process for which the software is to be developed. At some point of this model-driven approach, the logical model has to be transformed into a physical representation or artifact (such as a code representation) that additionally satisfies non-functional requirements. Among the non-functional requirements are the technical constraints of the particular software and hardware platform, including the programming language, that have to be taken into account.

For generating the physical code, a set of rules and patterns will have to be applied to the logical model. For example, in some cases, the software architecture defines different kinds of classes. A first kind a classes may represent persistent entities, while a second kind of classes represents processes or process steps. Whether a specific element of the logical model is an entity or a process is of course a functional issue. However, the way how a logical entity will eventually be transformed into the corresponding physical representation is generally the same for all logical entities, and the same holds for the transformation of logical processes.

To assist a software developer in his work and to automate as many steps as possible in the software development process, generative software development approaches have been introduced. Generative software development exploits the fact that the step from a logical model to the physical artifact can be regarded as the application of a set of transformation rules to the various elements of the logical model. So basically one has to define the individual transformations, specify when to apply them and annotate the logical model with some control information that controls the automated transformation process.

Transformations are typically defined via templates. For each of the different physical artifacts that need to be generated, a separate template or set of templates will have to be provided. The templates include transformation logic specifying how the individual elements of the logical model are to be transformed into their physical counterparts. The logical model, in turn, includes annotations specifying which template to use for a particular type of model element. In an conventional UML (Unified Modeling Language) scenario, the annotations are for example constituted by stereotypes or tagged values.

Since not everything can be defined in the model, certain procedural aspects can be defined by programming inside the generated physical constructs. Therefore, a model may include protected sections in which the developer can directly write program code that is to be protected from the transformation run. The protected section guarantees that the manually entered code survives changes in the model. So even if the model is (e.g. iteratively) changed, the code in the protected sections will still remain in the same logical place.

Today, there are attempts to apply the concept of model-driven development (MDD) to the service paradigm underlying the so-called service-oriented architecture (SOA). The SOA aims at providing the functionalities of a complex software component via individual services. In the SOA context, individual services may be used and re-used, rather than copying the corresponding program code or, more generally, the physical artifact. This becomes possible as the service is abstracted away from a particular platform-specific implementation.

In conventional SOAs the individual services are merely regarded as "black boxes" with interfaces to other services. In other words, the internal structure of the services does not play a major role for the implementation of a SOA. However, when applying the principles of MDD to the modeling of individual services, the internal structure of the service model is of course an important aspect.

Therefore, the object underlying the invention generally relates to an efficient combination of MDD with SOA. In particular, a technique for efficiently modeling a service for generative software development is required.

SUMMARY OF THE INVENTION

According to a first aspect, a template-driven system for generating platform-specific artifacts, such as program code, from platform-independent service models is provided. The system comprises a template storage with platform-specific templates, each template including platform-specific model transformation information; a repository with a plurality of at least essentially platform-independent service model elements and one or more service models modeled from the model elements; and a generator adapted to generate platform-specific artifacts by applying the transformation information included in the templates to the service models.

Although the service models and the model elements that constitute the services models may be platform-independent to the largest possible extent, in one variation the model elements may nonetheless be associated with minor platform-specific information. For model elements that correspond for example to attributes, this platform-specific information may include attribute-related format information.

At least some of the service model elements may be shared by two or more service models. This re-use of previously defined model elements for a plurality of service models reduces redundant modeling efforts. Moreover, change management is facilitated as changes to an individual model element will automatically be reflected in each service model comprising this model element.

The system may further comprise a service model creator for creating at least one of service model elements and platform-independent service models from the service model elements. The output of the service model creator is preferably again stored in the repository.

In one variation, the service model elements included in the repository are hierarchically structured. Such a hierarchical structure facilitates the creation of service models and additionally helps to structure the internal design of the repository. The repository may be configured as a database (e.g. a relational database).

Based on the hierarchical structured model elements, each service may be modeled from one or more first model elements of a higher hierarchy level and one or more second model elements of a lower hierarchy level. In the service model, each first model element may be associated with one or more second model elements. In such a case, the one or more second model elements preferably constitute attributes of the first model elements.

The first model elements may define at least one of one or more service input parameters and one or more service output parameters. On the other hand, the second model elements may constitute leaf fields in at least one of a service input parameter tree and a service output parameter tree.

In a further variation, the service models in the repository are associated with mappings. The mappings may occur between two or more model elements or between model elements and database tables. The mappings may define transfer operations between model elements belonging to the same hierarchy level. In one implementation, the mappings define transfer operations between one or more service input parameters and one or more service output parameters. The input parameters and output parameters may belong to one and the same or, alternatively, they may belong to different services.

For service modeling, predefined service types and service publicities may be selectable. The service model creator may then allow for a selection of at least one of a service type and a service publicity. The service types preferably include one or more of a process service, an entity service, a presentation service, a technical service, a batch job and a view. In such a scenario, the template storage may include at least one dedicated template for each service type. The service type can thus be interpreted as a transformation control parameter.

Additionally, specific kinds of first model elements may be defined and selectable via the service model creator for service modeling. The kinds of first model elements may constitute transformation control parameters when generating the physical artifacts. The generated artifacts may include at least one of bytecode (such as Java™ code), business-oriented programming language such as Cobol™ code, HTML code and XML code.

There may exist a plurality of predefined platform types defining the physical implementation of a particular service model. Preferably, the generator allows for a selection of a platform type. For each platform type, the template storage may include at least one dedicated template. Moreover, the template storage may include for various combinations of service type and platform type at least one dedicated template.

According to a further aspect of the invention, a repository database is provided. The repository database comprises at least essentially platform-independent model elements and service models modeled from the model elements, the service models forming the basis for the generation of platform-specific artifacts under the control of platform-specific templates, each template including platform-specific model transformation information.

According to a still further aspect of the invention, a method for generating platform-specific artifacts, such as program code, from platform-independent service models is provided. The method comprises the steps of providing platform-specific templates, each template including platform-specific model transformation information; providing a plurality of at least essentially platform-independent service model elements and one or more service models modeled from the model elements; and generating platform-specific artifacts by applying the transformation information included in the templates to the service models.

The invention can be practiced in the form of hardware, in the form of software, or in the form of a combined hardware/software approach. As for a software aspect, a computer program product is provided. The computer program product comprises program code portions for performing the steps of the present invention when the computer program product is run on one or more computing devices. The computer program product may be stored on a computer-readable recording medium.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following description, for purposes of explanation and not limitation, specific details are set forth, such as particular sequences of steps, user interfaces and device configurations in order to provide a thorough understanding of the present invention. It will be apparent to one skilled in the art that the present invention may be practiced in other embodiments that depart from these specific details.

Moreover, those skilled in the art will appreciate that the functions explained herein below may be implemented using software functioning in conjunction with a programmed microprocessor or general purpose computer. It will also be appreciated that while the current invention is primarily described in the form of methods and devices, the invention may also be embodied in a computer program product as well as in a system comprising a computer processor and memory coupled to the processor, wherein the memory is encoded with one or more programs that may perform the functions disclosed herein.

Figure 1:
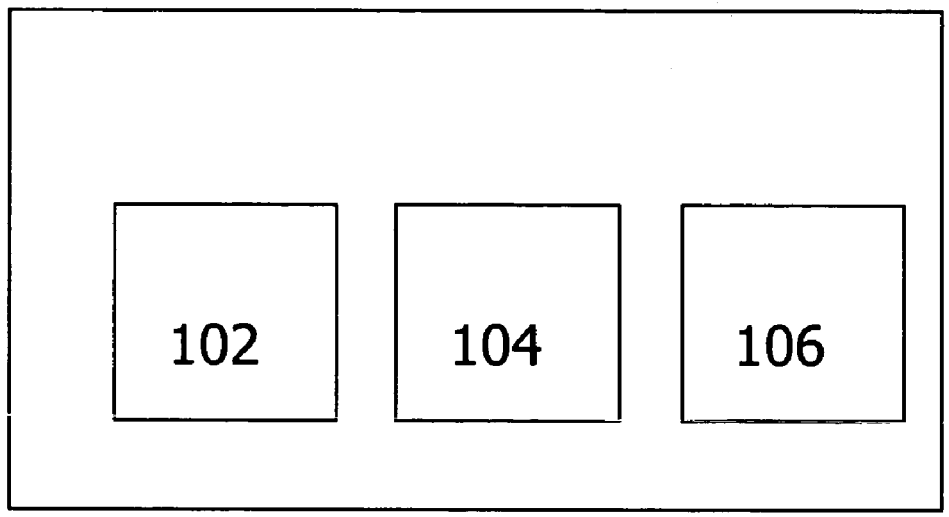
FIG. 1 is a schematic block diagram illustrating a first device embodiment of the present invention.

FIG. 1 shows an embodiment of a template-driven system 100 for generating platform-specific artifacts from platform-independent service models. The system 100 comprises three main components: a template storage 102, a repository database 104, and a generator for platform-specific artifacts 106. In the template storage 102 platform-specific templates are stored. Each template includes platform-specific transformation information.

The repository database 104 includes a plurality of at least essentially platform-independent service model elements and one or more service models modeled from the model elements. The model elements included in the repository database are preferably shared by several of the service models. This reduces the overall number of model elements that have to be stored.

The generator 106 generates platform-specific artifacts. To this end, one or more of the platform-specific templates included in the template storage 102 are applied to the platform-independent service models stored in the repository database 104.

Figure 2:
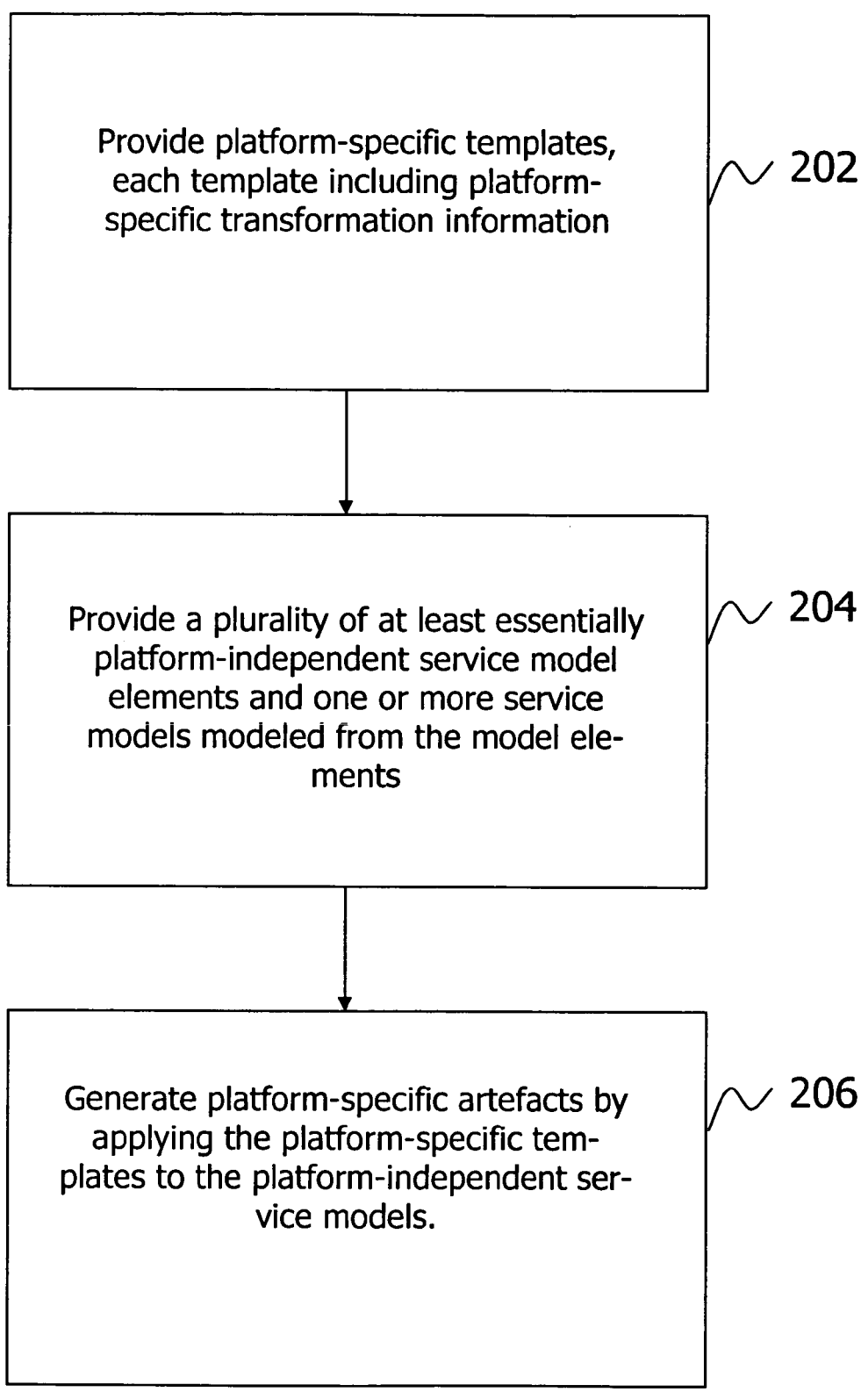
FIG. 2 is a flowchart illustrating a first method embodiment of the present invention.

FIG. 2 shows a flowchart 200 illustrating a method embodiment for generating platform-specific artifacts from platform-independent service models. The method may be performed by the system 100 shown in FIG. 1 or any other device.

The method starts, in step 202, with the provision of platform-specific templates. Each template includes platform-specific transformation information required for transforming a particular service model into a particular artifact.

In a next step 204 a plurality of at least essentially platform-independent service model elements are provided. Additionally, one or more service models modeled from the model elements are provided.

In a further step 206, platform-specific artifacts are generated. For generation of the artifacts, one or more of the platform-specific templates are applied to a particular platform-independent service model.

Figure 3:
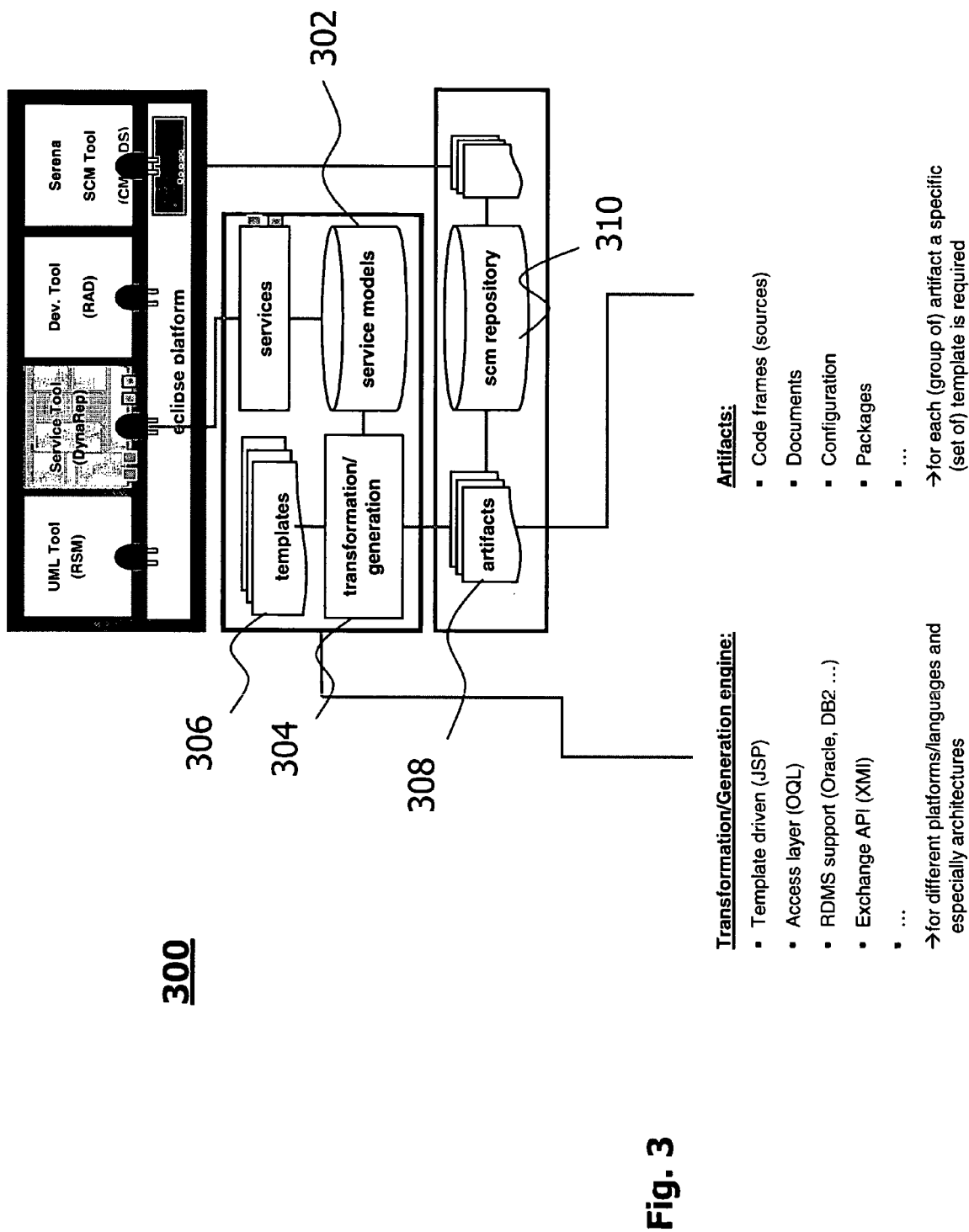
FIG. 3 is a schematic block diagram illustrating a second device embodiment of the present invention.

FIG. 3 shows a further system 300 for generating artifacts from platform-independent service models. The system 300 includes a repository database 302 for service models (and service model elements) and a template-driven generator 304 for generating artifacts 308 for the service models stored in the repository database 302.

The transformation of service models to artifacts is controlled by template files 306. In the present embodiment, for each individual platform a specific set of one or more template files 306 is provided. If needed, the generated artifacts may manually be completed (e.g. within so-called protected areas) before storing them in a software component management repository 310.

Figure 4:
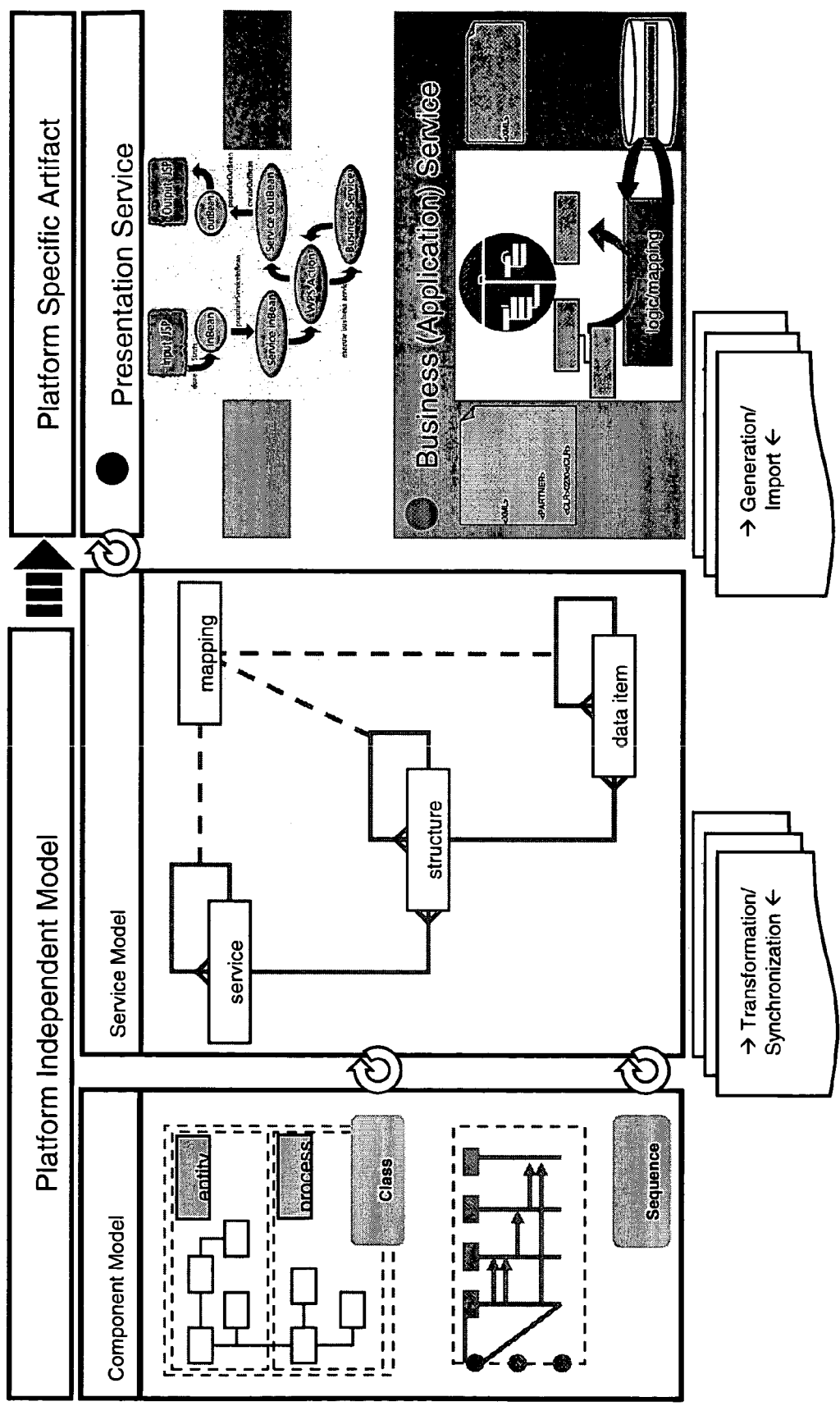
FIG. 4 is a schematic diagram illustrating the major functionalities of the second device embodiment.

FIG. 4 schematically shows the way of a platform-independent model to a platform-specific artifact as implemented in the systems 100 and 300 discussed above. Starting with a platform-independent component model, a platform-independent service model is generated first. The platform-independent service model is then transformed into a platform-specific artifact such as an executable presentation or application (business) service.

Figure 5:
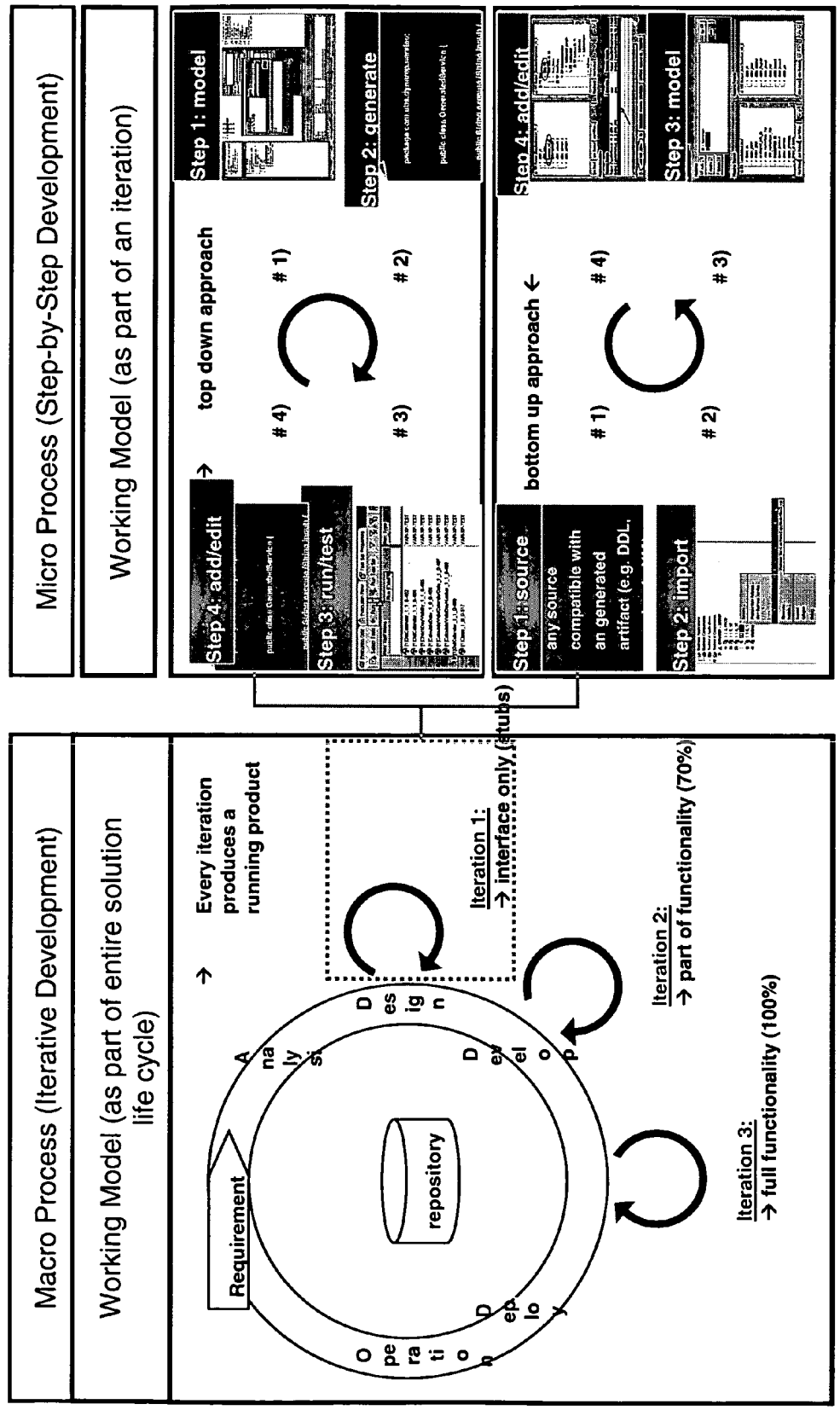
FIG. 5 is a schematic diagram illustrating an iterative development process used in context with the embodiments and two different service modeling approaches.

FIG. 5 illustrates, on the left-hand side, the iterative generation of a service starting from a service model. On the right-hand side, the two basic approaches for generating a physical artifact are shown, namely the top-down approach on the one hand and the bottom-up approach on the other hand. These approaches will later be described in more detail with reference to the user interfaces of FIGS. 12 to 74.

Figure 6:
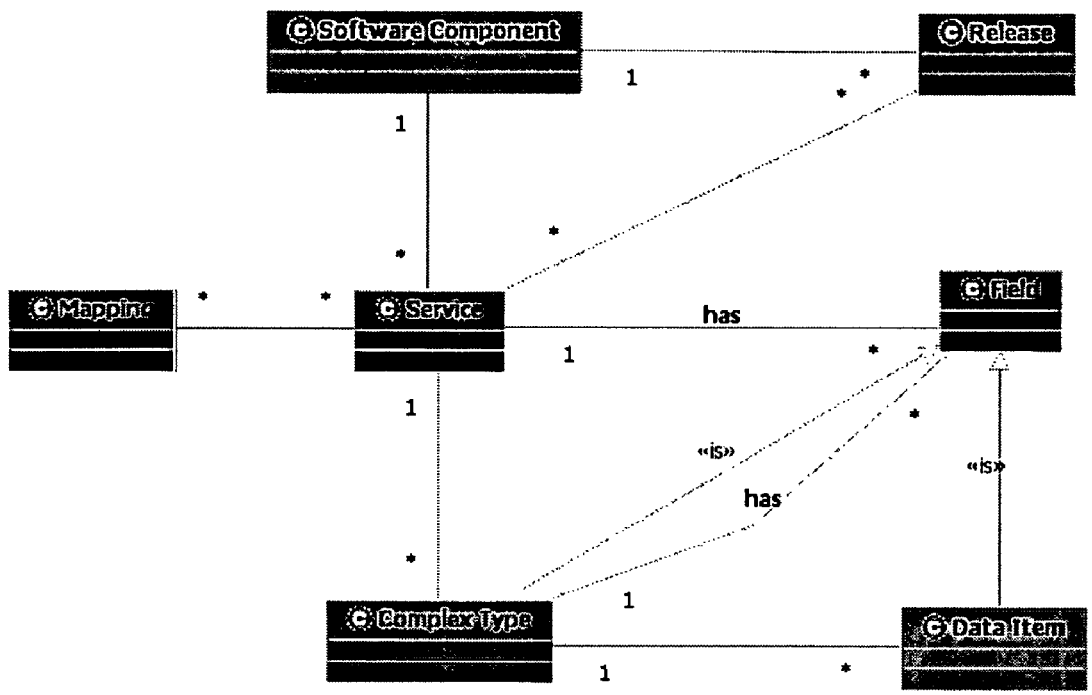
FIG. 6 is a schematic diagram illustrating the major entities of the logical data model used in the embodiments.

The main elements of the logical data model used in the present embodiments are shown in FIG. 6. The logical data model provides the basis for the physical database design of the repository database 302. It is independent of the implementation and thus makes a clear distinction between specification and implementation on the database. Its physical model is more complex and contains many more elements, which are relevant to store all detailed information about each of the main elements. Nevertheless, the logical data model as shown in FIG. 6 is the key to the overall repository database.

Figure 7:
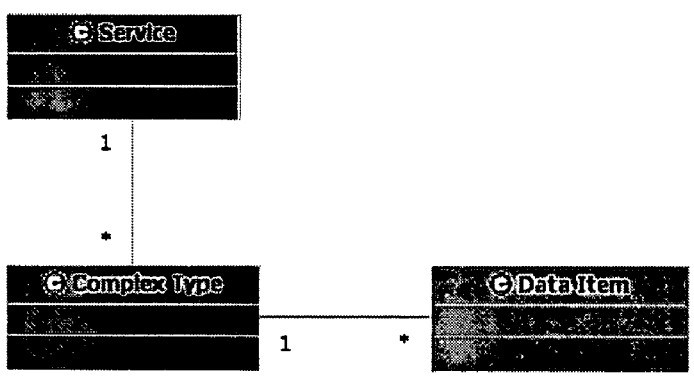
FIGS. 7 to 9 are schematic diagrams illustrating the individual parts of the logical data model of FIG. 6.
Figure 8:
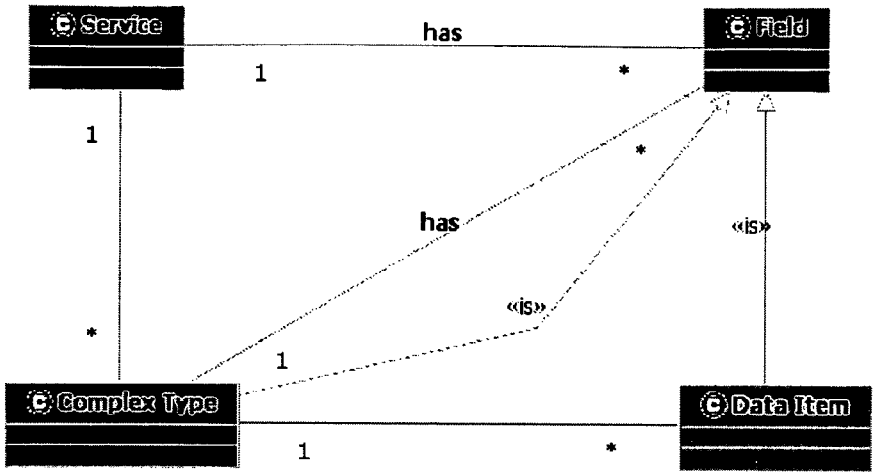
Figure 9:

One service is modeled from two basic and hierarchically structured model elements, complex type model elements (or simply "complex types"), which may again comprise complex types, on the one hand and data item model elements (or simply "data items") on the other hand. These model elements are shown in FIG. 7. The relationship between a service and these two model element categories is represented via a field element as shown in FIG. 8. The field element is an instance of an individual data item and manages the relationship and usage of data items within complex types. The relationship between individual services is represented via a mapping element as depicted in FIG. 9.

Figure 10:
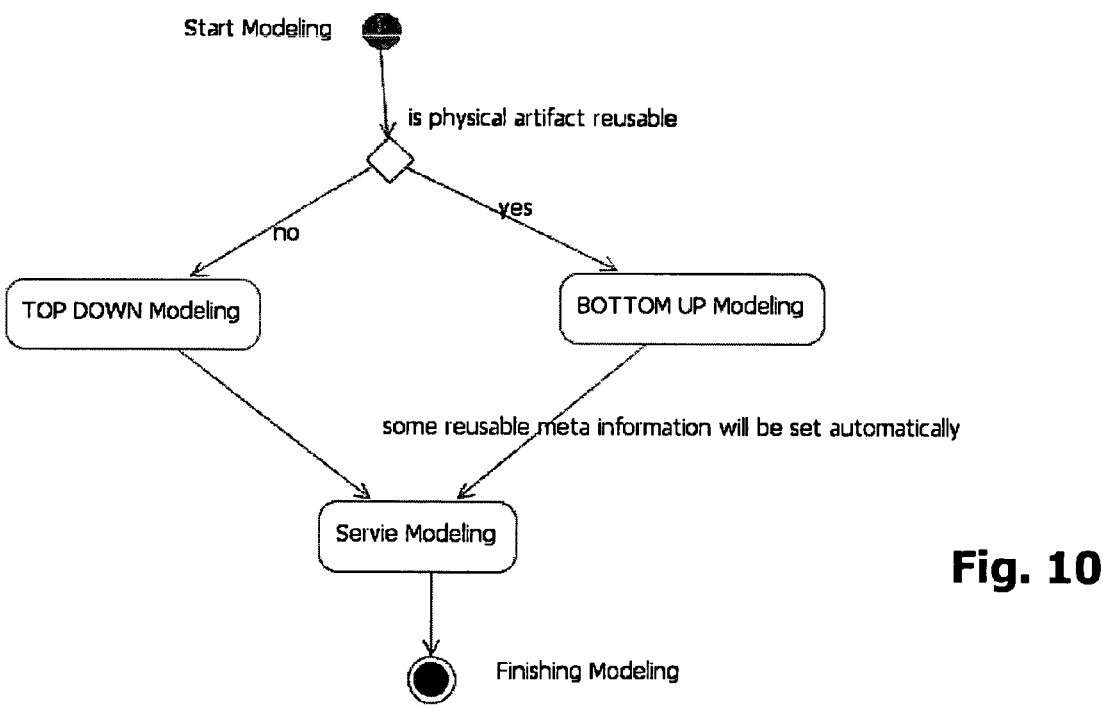
FIG. 10 is a flowchart illustrating the decision process relating to two fundamental modeling approaches.
Figure 74:
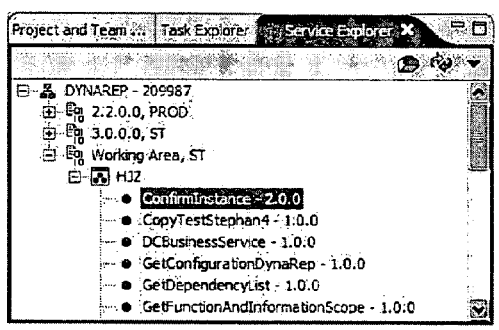

In the following a tool for generating service models for a particular software component will be discussed with reference to FIGS. 10 to 74. As shown in FIG. 10, and as already mentioned in context with FIG. 5, the tool permits two ways of service modeling. The top-down implementation shown on the left hand side of FIG. 10 is used in the case that no specific artifacts are available for reuse ("green field modeling"). The bottom-up implementation shown on the right hand side of FIG. 10 has some prerequisites, some physical implementations (such as a database table description, source code, . . . ) that will be reused for service design ("modeling based on physical artifact"). The meta model will be the same in each case.

The top-down implementation will be described first with respect to the steps listed in the following table and illustrated in FIG. 11:

| Step | Step Name | Description of Step |
|---|---|---|
| 1 | Initiate a New Service Design | Create New Service Header |
| 2 | Service Interface Design | Create new Complex Type Create new Data Item |
| 2a | Tree Modeling | Create Attributes with Tree Editor |
| 2b | Graphical Modeling | Create Attributes with Graphical Editor |
| 3 | Service Orchestration | Create Mappings |
| 4 | Exception Management | Error Messages Management |
| 5 | Documentation Management (optional) | Documentation |
| 6 | Quality Management (optional) | Request for Service Version Review |

The service for which the service model is to be created may for example be the mutation of a customer address in a database or the search for customers in the database that fulfill certain criteria. Before starting the modeling of a service, the software developer has to think about the interfaces of the service to be modeled, i.e. the input and output parameters, as well as how the input parameters are transferred ("mapped") to the output parameters.

Figure 11:
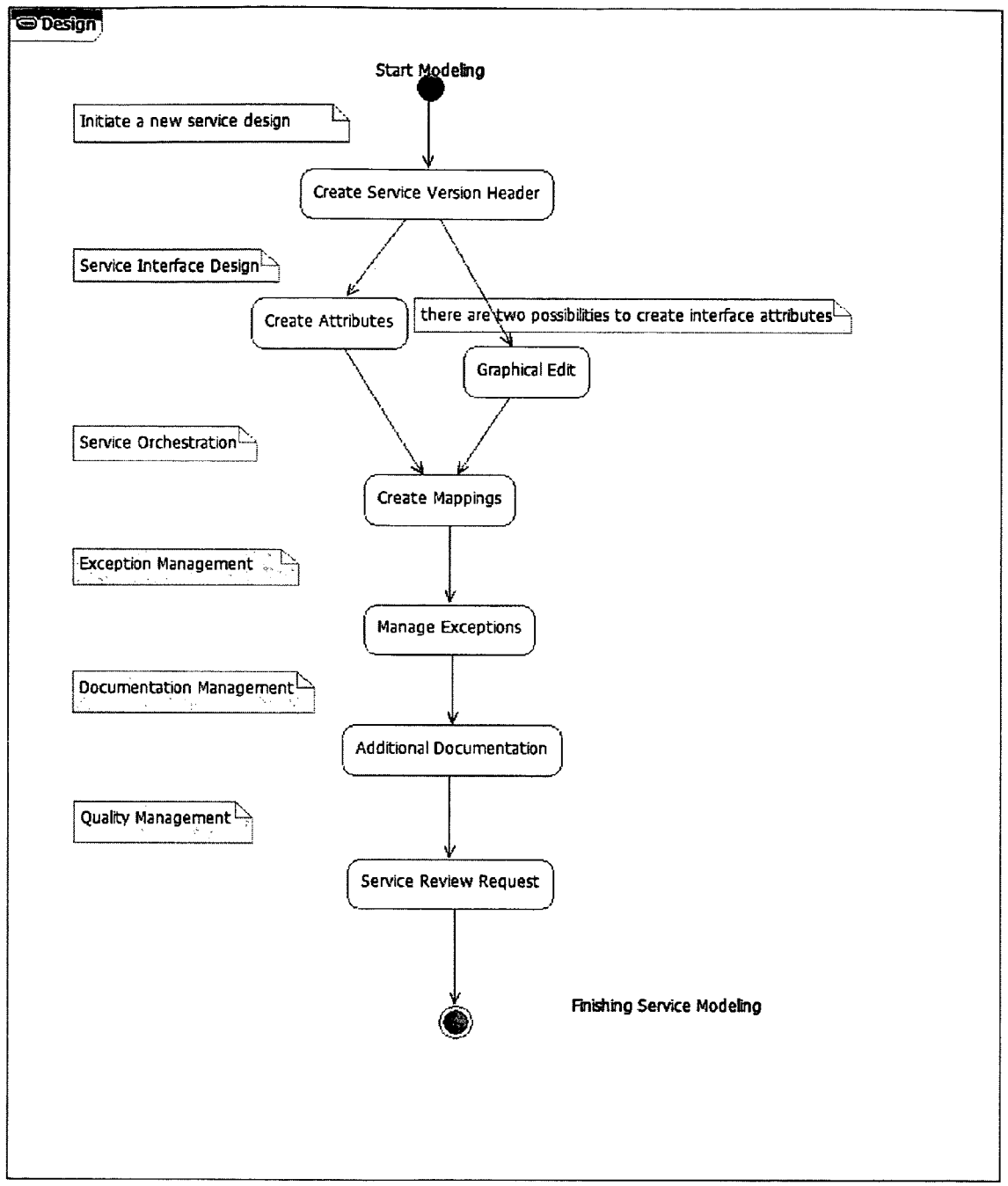
FIG. 11 is a flowchart illustrating the basic steps of a second method embodiment for generating a service model.
Figure 12:
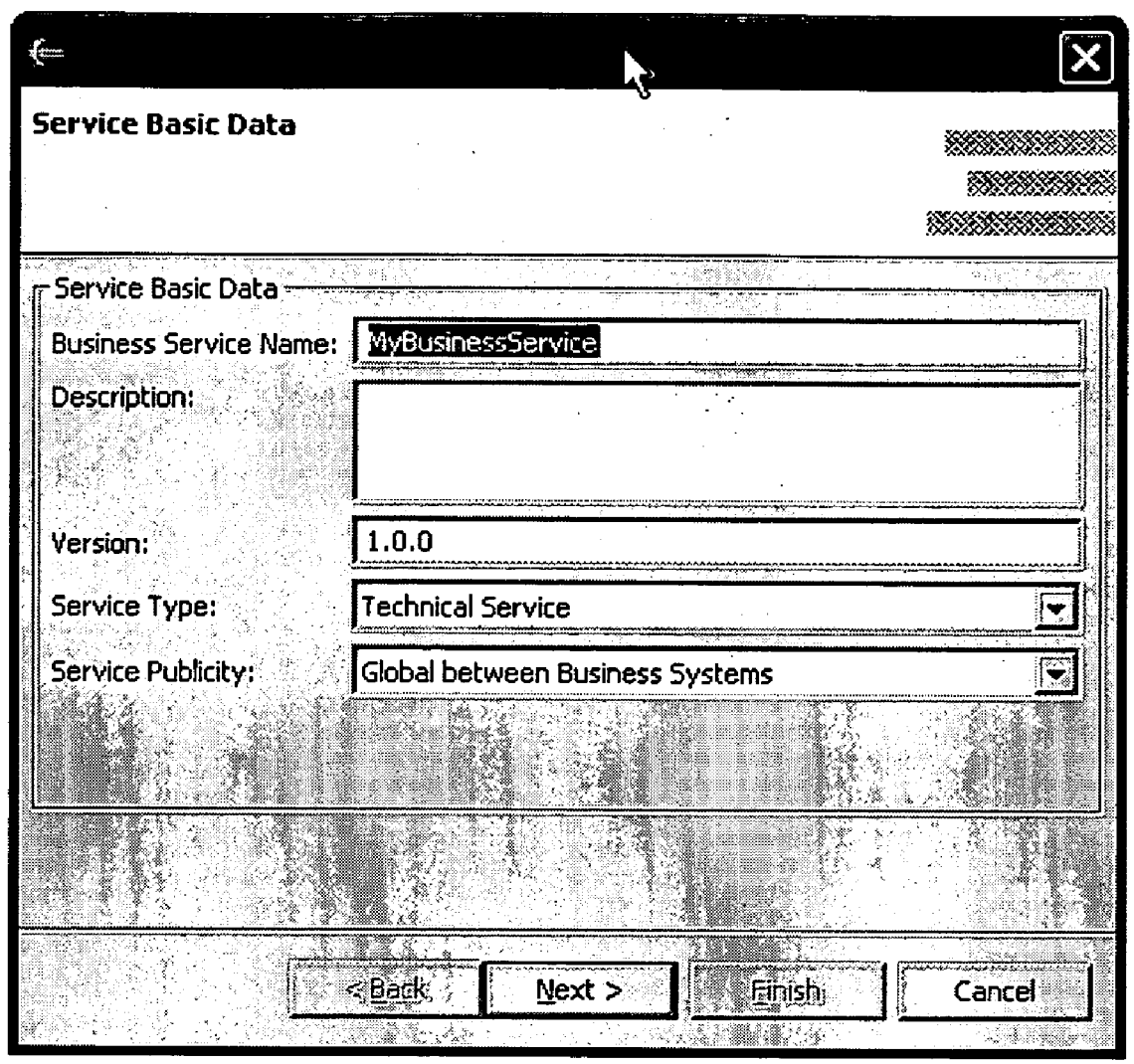
FIGS. 12 to 74 illustrate various user interfaces for use in the second method embodiment.

Referring now to step 1 of FIG. 11, the initiation of a new service model for a particular software component (that may include further services) starts with the display of a graphical user interface as shown in FIG. 12. The user interface of FIG. 12 requests the input of service parameters as illustrated in the following table:

| | |
|---|---|
| Service Name | Unambiguous name of the service. The name and version must be unique within the particular software component |
| Description | Short description of the service |
| Version | Version number of the new service (usually 1.0.0 because it is a new one) |

-continued

| | |
|---|---|
| Service Type | Selection between:<br>Entity Read Service<br>Entity Read List Service<br>Entity Insert Service<br>Entity Delete Service<br>Entity Update Service<br>Batch Program/Job/Service<br>Process Service—Request for Information<br>Process Service—Request for Processing<br>Service—View<br>Technical Service<br>Presentation Service |
| Service Publicity | Selection between:<br>Local within Software Component<br>Local within Software Component (with publishing)<br>Local within Business Domain<br>Local within Business System<br>Global between Business Systems |

Figure 11A:
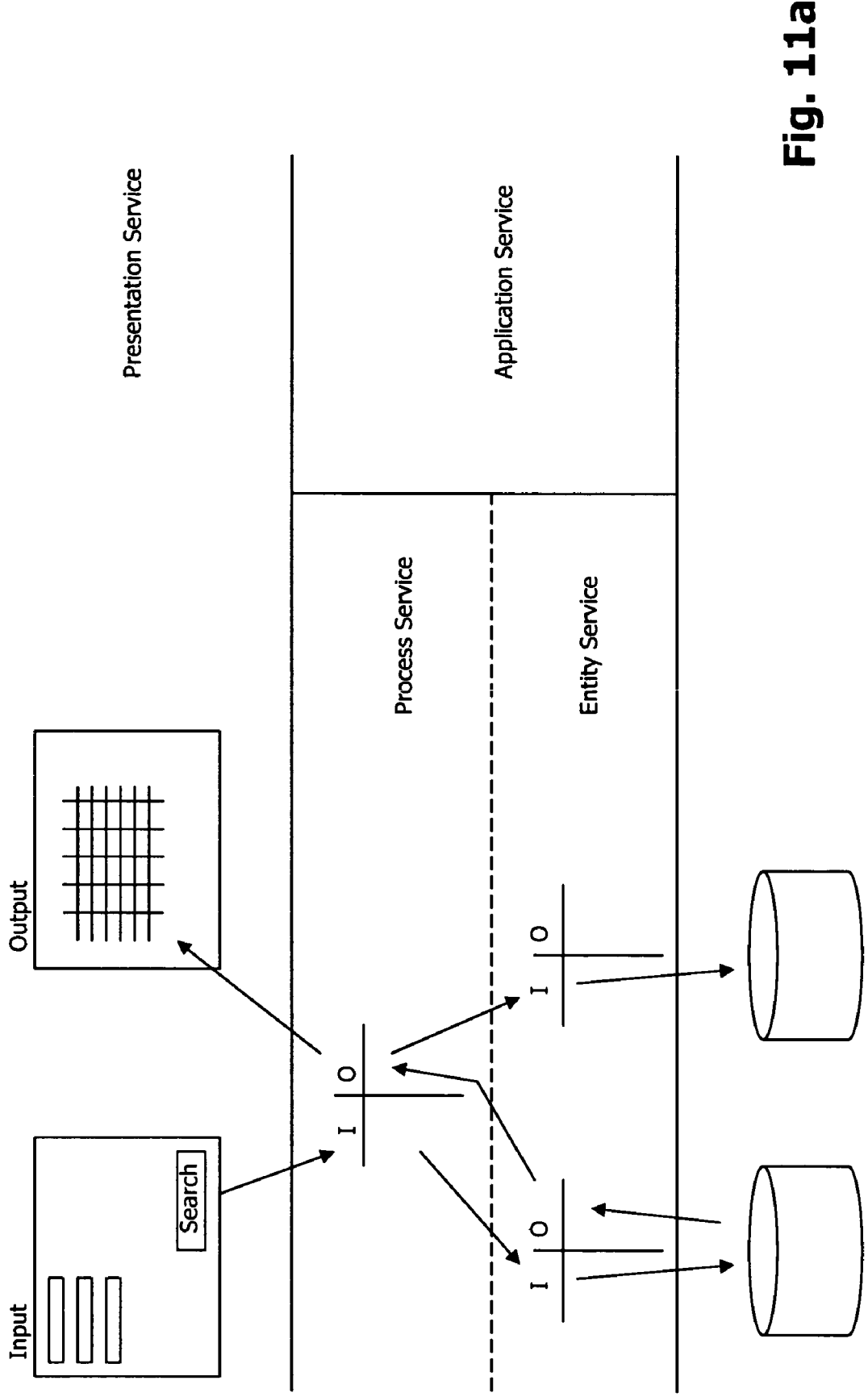
FIG. 11a is an overview illustrating the definition of various kinds of services as used herein.

The tool supports different service types and different publicity categories. FIG. 11a schematically illustrates in a layered manner some of the various service types that can be selected. Presentation services reside on an upper layer. This service type mainly provide visual functionalities in context with requesting information from a user and/or displaying information to a user. On a lower layer, database services are provided. A middle layer provides general application services that are neither presentation services nor database services (sometimes also called business services herein). There are two types of application services: process services and entity services. Entity services generally have database access (e.g. they read data from a database or write data into a database using the corresponding database service). Process services, on the other hand, have no (direct) database access. They perform one or more dedicated processing operations and include the application logic required for this task.

The selection of a particular service type via the user interface of FIG. 12 influences the template (or template set) that will later be used when transforming the corresponding service model into a particular artifact. In other words, there will be one or more dedicated templates for presentation services (specifying, for example, the visual appearance of the resulting graphical user interface), one or more dedicated templates for entity services (specifying, for example, the database interfaces), and so on.

Each publicity category in the above table indicates the availability of the service model (or its elements) for re-use a hierarchical software environment that includes, from a lower hierarchy level to a higher hierarchy level, the levels "Software Component", "Business Domain", and "Business System". The software components themselves are also categorized in such a manner that each individual software component category is associated with particular sub-sets of service types (and, optionally, publicity categories).

In principle, a service always belongs to a particular software component, which means that service governance is performed via the associated software component. Each software component has an owner, which is at the same time the owner of all the services assigned to this software component. As mentioned above, there are different categories of software components (such as application components for the backend, presentation components for the front-end, and technical components for technical purposes). Accordingly, a presentation service can only exist within a presentation component, an application service can only exist within an application component, and so on. Generally speaking, the type of a particular software component controls the service types that may be associated therewith. A presentation service may for example not exist within an application component. On the other hand, a presentation service always requires at least one application service for performing an operation within the backend (e.g. a backend processing operation or a database operation). The reason for this is the fact that presentation services are not allowed to access databases or include backend processing logic. These tasks are always performed by application/business services.

Figure 13:
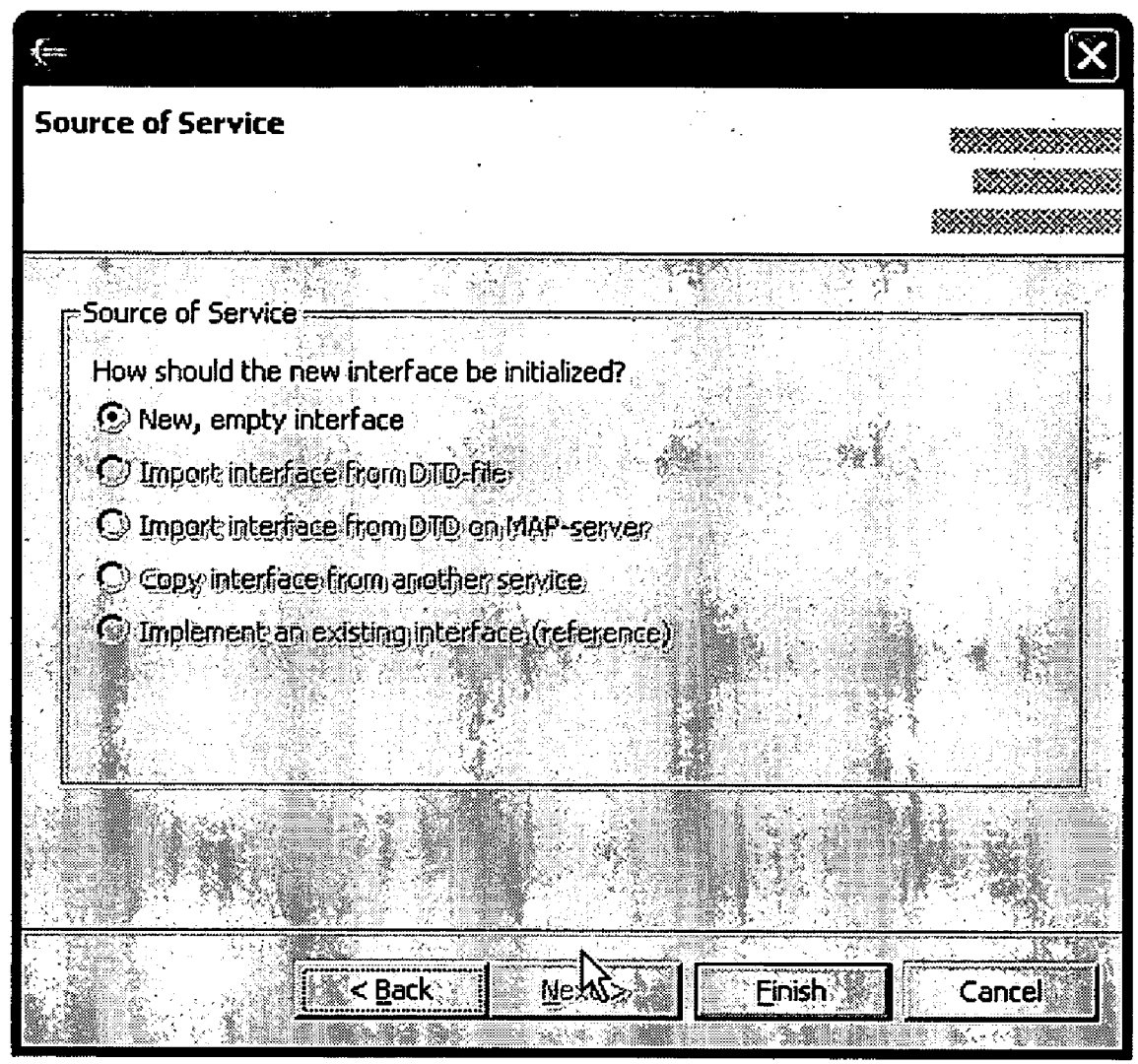
Figure 14:
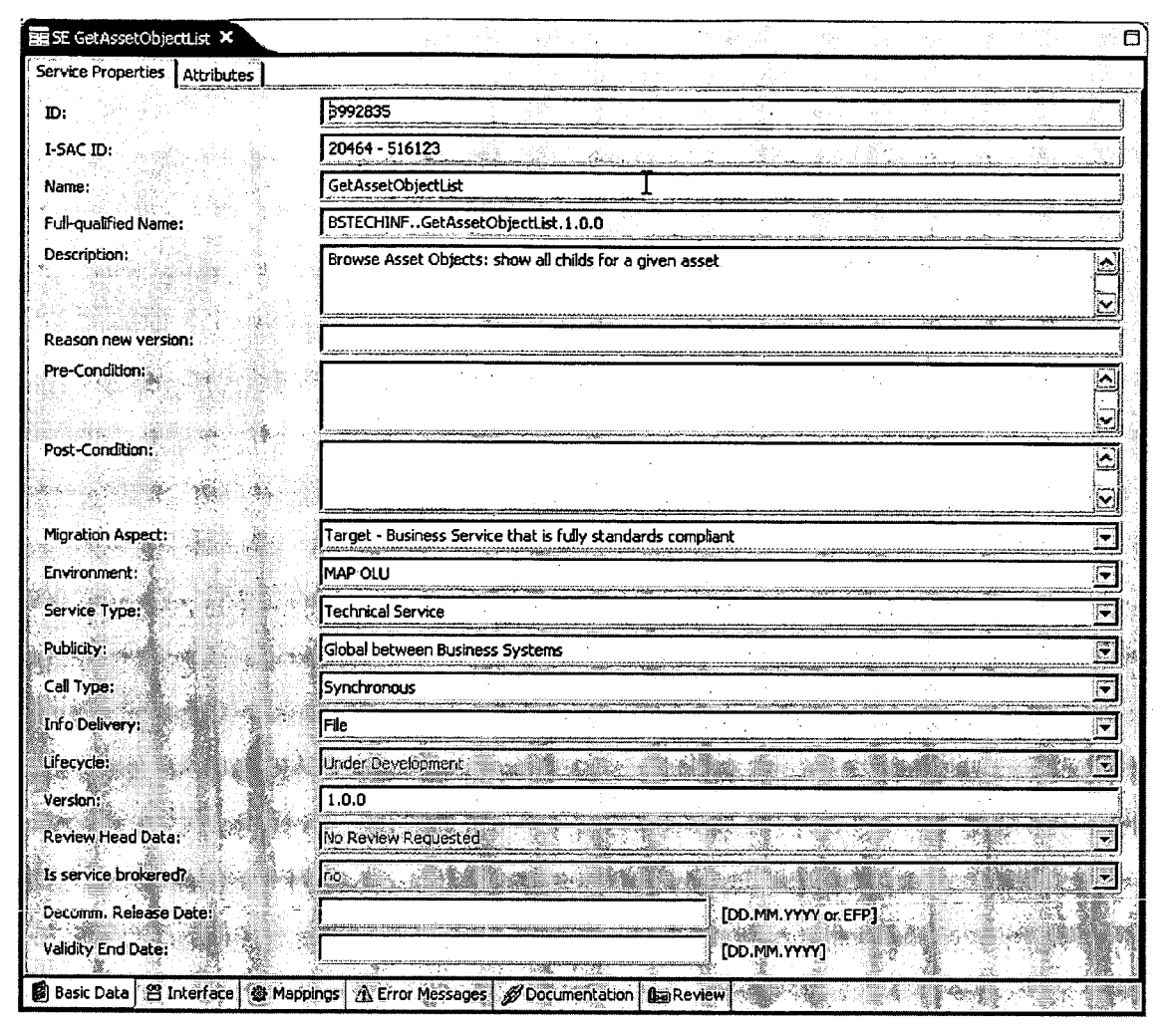

Returning now to FIG. 12, clicking the "Next" button leads to the user interface of FIG. 13. Using this user interface, the type of input (only the option "New, empty interface" is available here) can be selected. By clicking "Finish", the tool creates the new service with the version as set in the previous user interface ("1.0.0" if not changed). In order to change service parameters or add properties to the service, the service need to be newly opened in a service editor module (not shown). FIG. 14 shows the corresponding user interface that allows for an editing of the "basic data" of a service that is to be newly generated.

Figure 15:
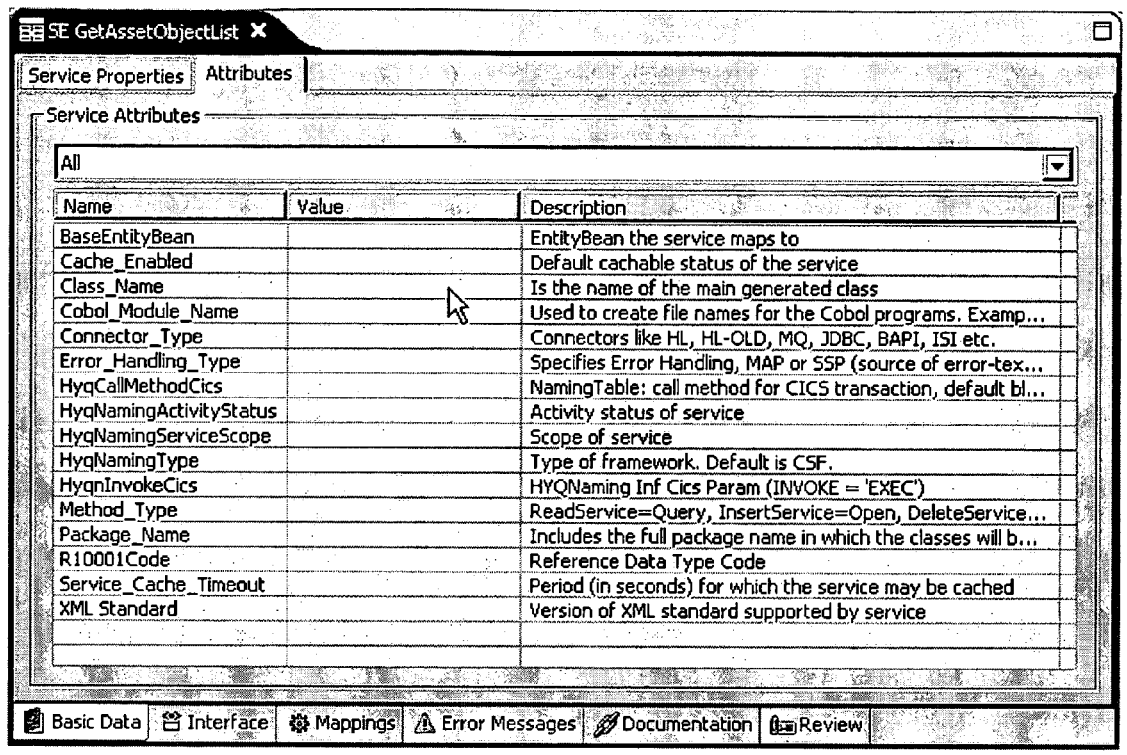

Implementation-specific attributes can be defined via the tab "Attributes" in the lower left corner of the user interface shown in FIG. 14. The "Attributes" user interface is illustrated in FIG. 15. It should be noted that although the service modeling is to a large extent implementation-independent, it might nonetheless be advantageous to specify a small amount of implementation-specific information already when modeling the service.

Once the basic data and attributes for a new service have been defined, the modeling continues with associating one or more model elements of the "complex type" with the service that is to be modeled. It has already been explained with reference to FIG. 7 that in the service model of the present embodiment, each service necessarily includes one or more complex types, and each complex type may in turn include one or more further complex types.

Before discussing the mechanisms of assigning model elements of the complex type to a service In detail, exemplary service modeling rules with respect to complex types will be discussed first. In the present embodiment, three different kinds of such elements are defined: namely the sequence kind (FIG. 16), the list kind (FIG. 17) and the choice kind (FIG. 18). Each particular kind of complex type is associated with a particular transformation operation when generating an artifact. Accordingly, and similar to the service type, the complex type kind specified during model creation acts as a control parameter for the subsequent transformation process.

For a better understanding, the different kinds will now be explained in an exemplary context with address data fields.

Figure 16:
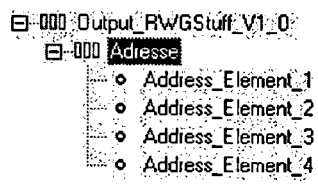

FIG. 16 shows the complex type "Adresse" of the sequence kind. This kind of complex type consists of a sequence of individual fields (see FIG. 8), here titled "Address-Element_1"to "Address_Element$_{13}$ 4", as shown in the following table:

| Name | Typ | Implementation Name |
|---|---|---|
| Adresse | Complex Type/Sequence | ADRESSE |
| Address_Element_1 | Field | ADR-ZEILE-1 |
| Address_Element_2 | Field | ADR-ZEILE-2 |
| Address_Element_3 | Field | ADR-ZEILE-3 |
| Address_Element_4 | Field | ADR-ZEILE-4 |

When transforming the complex type "Adresse" of FIG. 16 into an exemplary business-oriented programming language such as COBOL™ copybook code, the following output (artifact portion) will be generated:

```
<!ELEMENT Output (Adresse)>
<!ELEMENT Adresse (Address_Element_1, Address_Element_2,
Address_Element_3, Address_Element_4)>
<!ELEMENT Address_Element_1 (#PCDATA)>
<!ELEMENT Address_Element_2 (#PCDATA)>
<!ELEMENT Address_Element_3 (#PCDATA)>
<!ELEMENT Address_Element_4 (#PCDATA)>
```

When transforming the complex type "Adresse" of FIG. 16 into an exemplary COBOL copybook code, the following output (artifact portion) will be generated:

\*Definition of OUTPUT Interface without flags for Service\*

\*RWGStuff

```
05 :BLW:-ADRESSE.
    10 :BLW:-ADR-ZEILE-1          PIC X(35).
    10 :BLW:-ADR-ZEILE-2          PIC X(35).
    10 :BLW:-ADR-ZEILE-3          PIC X(35).
    10 :BLW:-ADR-ZEILE-4          PIC X(35).
```

Figure 17:
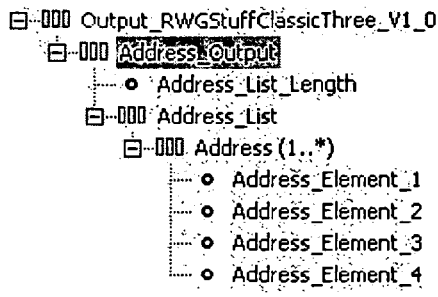
Figure 18:
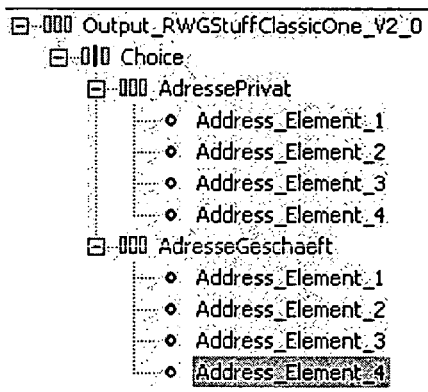
Figure 19:
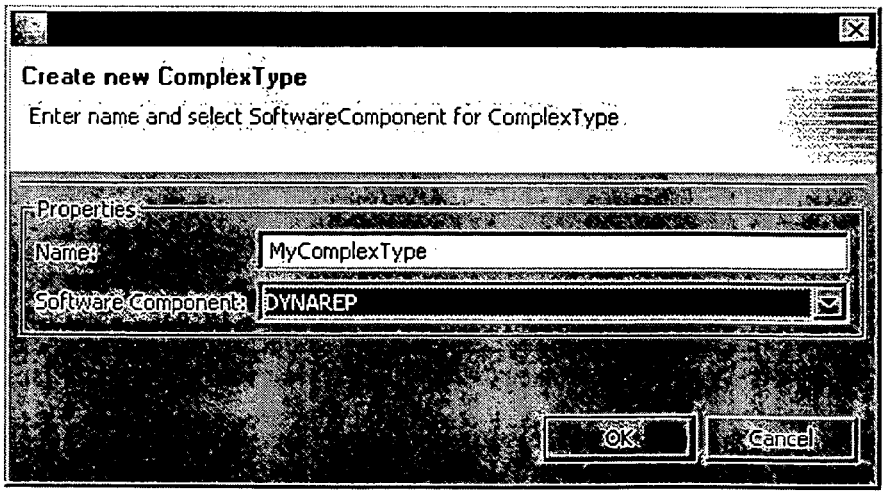

FIG. 17 shows the complex type "Address_Output" of the list kind. This kind of complex type consists of one or more complex types of the sequence kind (including the complex type "Address" explained above) and additionally of individual fields (including a list length parameter) as shown in the following table:

| Name | Type |
| --- | --- |
| Address_Output | Complex Type/Sequence |
| Address_List_Length | Field/numeric |
| Address_List | Complex Type/Sequence |
| Address | Complex Type/Sequence |
| Address_Element_1 | Field |
| Address_Element_2 | Field |
| Address_Element_3 | Field |
| Address_Element_4 | Field |

When transforming the complex type "Address_Output" of FIG. 17 into an exemplary business-oriented programming language such as COBOL™ copybook code, the following output (artifact portion) will be generated:

```
<!ELEMENT Output (Address_Output)>
    <!ELEMENT Address_Output
    (Address_List_Length, Address_List)>
    <!ELEMENT Address_List_Length (#PCDATA)>
    <!ELEMENT Address_List (Address+)>
    <!ELEMENT Address
    (Address_Element_1, Address_Element_2,
Address_Element_3,
    Address_Element_4)>
        <!ELEMENT Address_Element_1 (#PCDATA)>
        <!ELEMENT Address_Element_2 (#PCDATA)>
        <!ELEMENT Address_Element_3 (#PCDATA)>
        <!ELEMENT Address_Element_4 (#PCDATA)>
```

When transforming the complex type "Address_Output" of FIG. 17 into an exemplary COBOL copybook code, the following output (artifact portion) will be generated:

\*Definition of OUTPUT Interface without flags for Service\*

\*RWGStuff

```
05:BLW:-ADDRESS-OUTPUT.
    10:BLW:-ADDRESS-LIST-LENGTH            PIC 9(6).
    10:BLW:-ADDRESS-LIST.
        15:BLW:-ADDRESS
            OCCURS 1 TO 999 TIMES DEPENDING ON
            :BLW:-ADDRESS-LIST-LENGTH.
            20:BLW:-ADR-ZEILE-1            PICX(35).
            20:BLW:-ADR-ZEILE-2            PICX(35).
            20:BLW:-ADR-ZEILE-3            PICX(35).
            20:BLW:-ADR-ZEILE-4            PICX(35).
```

FIG. 18 shows the complex type "Choice" of the choice kind. This kind of complex type typically consists of two or more complex types of the sequence kind (including the complex type "Address" explained above) as shown in the following table:

| Name | Type |
| --- | --- |
| Choice | Complex Type/Choice |
| AdressePrivat | Complex Type/Sequence |
| Address_Element_1 | Field |
| Address_Element_2 | Field |
| Address_Element_3 | Field |
| Address_Element_4 | Field |
| AdresseGeschaeft | Complex Type/Sequence |
| Address_Element_1 | Field |
| Address_Element_2 | Field |
| Address_Element_3 | Field |
| Address_Element_4 | Field |

When transforming the complex type "Choice" of FIG. 18 into an exemplary DTD code, the following output (artifact portion) will be generated:

```
<!ELEMENT Output (Choice)>
<!ELEMENT Choice (AdressePrivat |
AdresseGeschaeft)>
<!ELEMENT AdressePrivat (Address_Element_1,
Address_Element_2,
Address_Element_3, Address_Element_4)>
<!ELEMENT AdresseGeschaeft (Address_Element_1,
Address_Element_2,
Address_Element_3, Address_Element_4)>
```

When transforming the complex type "Choice" of FIG. 18 into an exemplary business-oriented programming language such as COBOL™ copybook code, the following output (artifact portion) will be generated:

\*Definition of OUTPUT Interface without flags for Service\*

\*RWGStuff

```
05:BLW:-CHOICE.
    10:BLW:-ADRESSEPRIVAT.
        15:BLW:-ADDRESS-ELEMENT-1          PICX(35).
        15:BLW:-ADDRESS-ELEMENT-2          PICX(35).
        15:BLW:-ADDRESS-ELEMENT-3          PICX(35).
        15:BLW:-ADDRESS-ELEMENT-4          PICX(35).
    10:BLW:-ADRESSEGESCHAEFT.
        15:BLW:-ADDRESS-ELEMENT-1          PICX(35).
        15:BLW:-ADDRESS-ELEMENT-2          PICX(35).
```

-continued

| | |
|---|---|
| 15:BLW:-ADDRESS-ELEMENT-3 | PICX(35). |
| 15:BLW:-ADDRESS-ELEMENT-4 | PICX(35). |

In some cases a service model may re-use an existing complex type, in other cases a new complex type has to be created. For re-use, the required complex type may simply be selected from the previously defined complex types included in the repository database. Re-use of a previously defined complex type may be prevented by an incompatible publicity.

Creation of new complex type will now be discussed in context with the user interfaces shown in FIGS. 19 to 27. Creation of a new complex type (step 2 of FIG. 11) starts with the user interface of FIG. 19. This user interface requests the user to specify the name of the complex type that is to be newly created and the software component to which the complex type is to be assigned. Once the corresponding data have been input, they may be saved by clicking the "OK" button.

Figure 20:
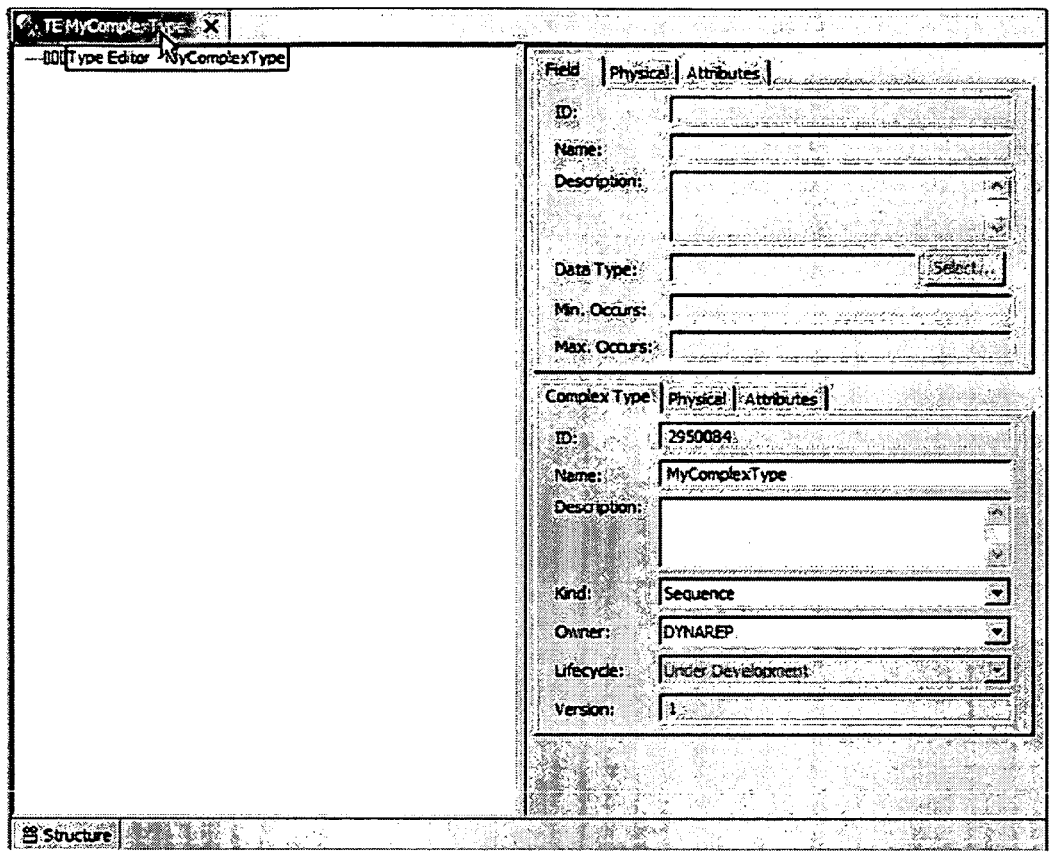

In a next step, the newly created complex type may be edited via the user interface shown in FIG. 20. This user interface allows for a selection of the kind of complex type (i.e., either sequence, list or choice as discussed above). Additionally, the user interface of FIG. 20 basically permits the creation of input or output fields via the menu shown in FIG. 21. Here, creation of a "sibling" creates an element on the same level, and creation of a "child" creates a child to an element. A leaf attribute, based on a data item type, can not have any children.

Figure 21:
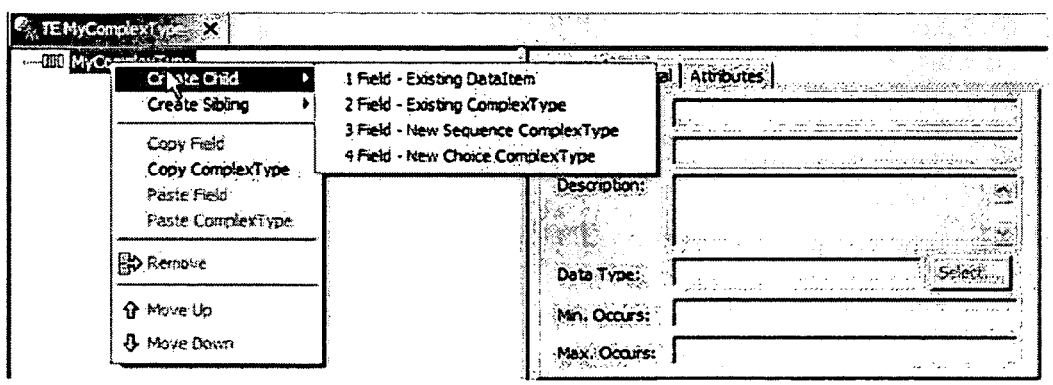

When selecting "Create Child" or "Create Sibling", five option are offered (on the top level shown in FIG. 21, the option "Create Sibling is disabled). This is illustrated in the following table:

| | |
|---|---|
| Field—Existing Data Item | Inserts an attribute based on an existing data item |
| Field—Existing Complex Type | Inserts a structure based on an existing complex type |
| Field—New Sequence Complex Type | Inserts a new complex type whose children form a sequence |
| Field—New Choice Complex Type | Inserts a new complex type. In a concrete instance of the complex type, only one of its children is present |

Figure 22:
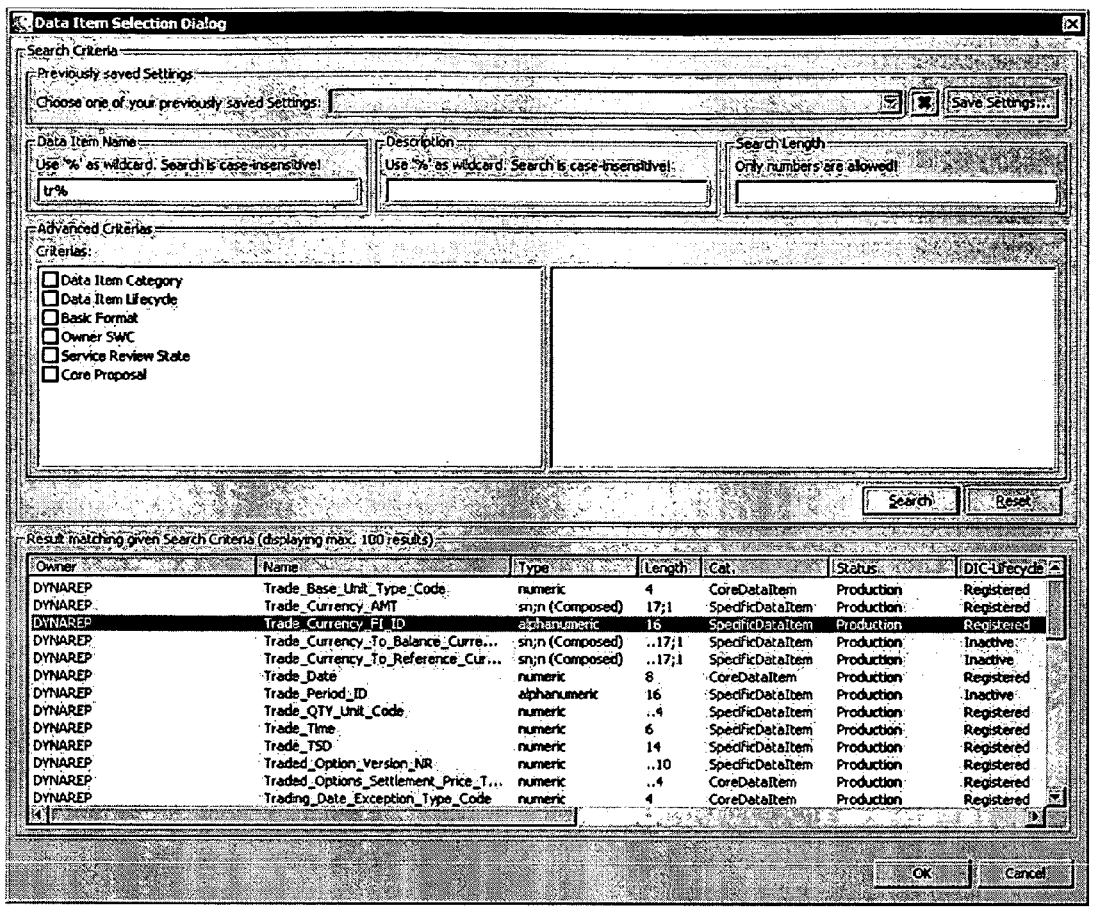
Figure 23:
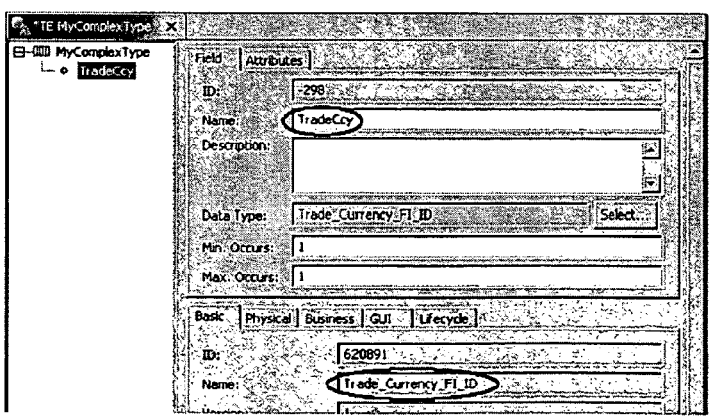

If, in the user interface of FIG. 21, the option "Existing Data Item" is chosen, the user interface of FIG. 22 is displayed. The user interface of FIG. 22 constitutes a data item selection dialog that allows for a re-use of an existing data item included in the repository database. All currently loaded data items are shown in the lower part of the user interface in FIG. 21. If the required data item is not yet shown, a search for this data item can be initiated based on search criteria that may be specified in the upper part of the user interface of FIG. 22. Once the data item that is to be inserted in the newly created complex type is selected and the button "OK" is clicked, a new field for the complex type based on the selected data item is created. In this context the user interface of FIG. 23 will be displayed and an appropriate name for this field can be entered.

Figure 24:
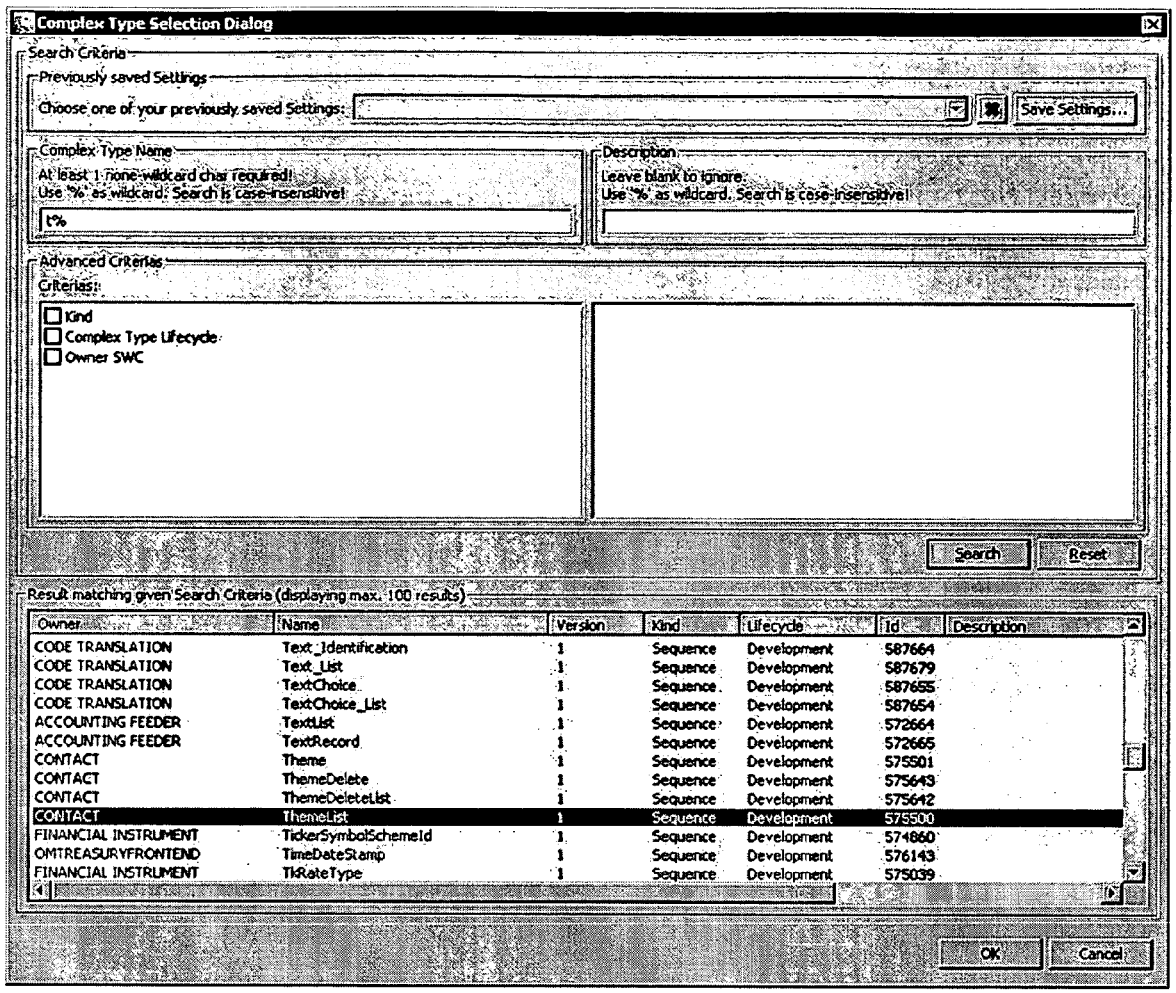
Figure 25:
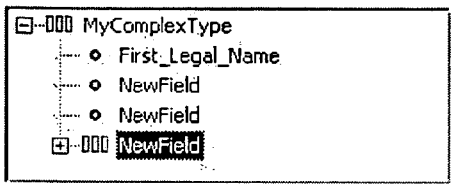

If, in the user interface of FIG. 21, the option "Existing Complex Type" is chosen, the user interface of FIG. 24 is displayed. The user interface of FIG. 24 constitutes a complex type selection dialog. All currently loaded complex types are displayed in the result list in the lower part of the user interface of FIG. 24. If the required complex type is not yet displayed, a search can be initiated based on search criteria that may be specified in the upper part of the user interface of FIG. 24. Once the complex type that is to be inserted in the newly created complex type is selected and the button "OK" is clicked, a new field based on the selected complex type is created as shown in FIG. 25.

Figure 26:
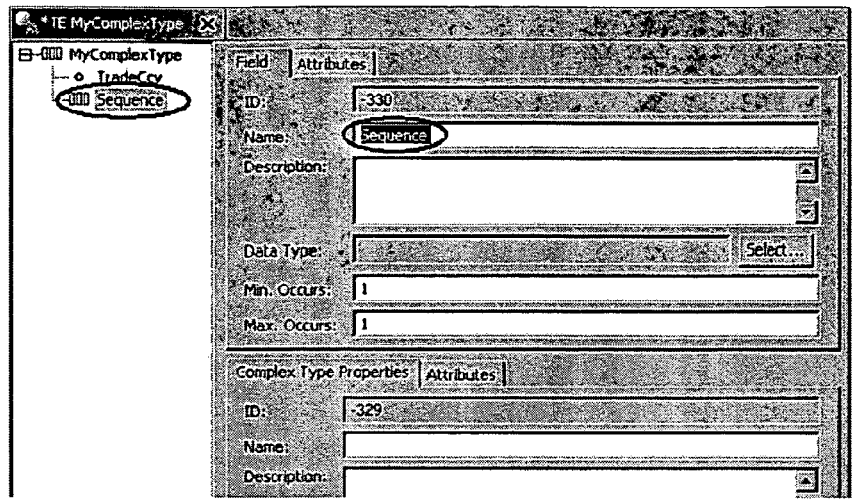
Figure 27:
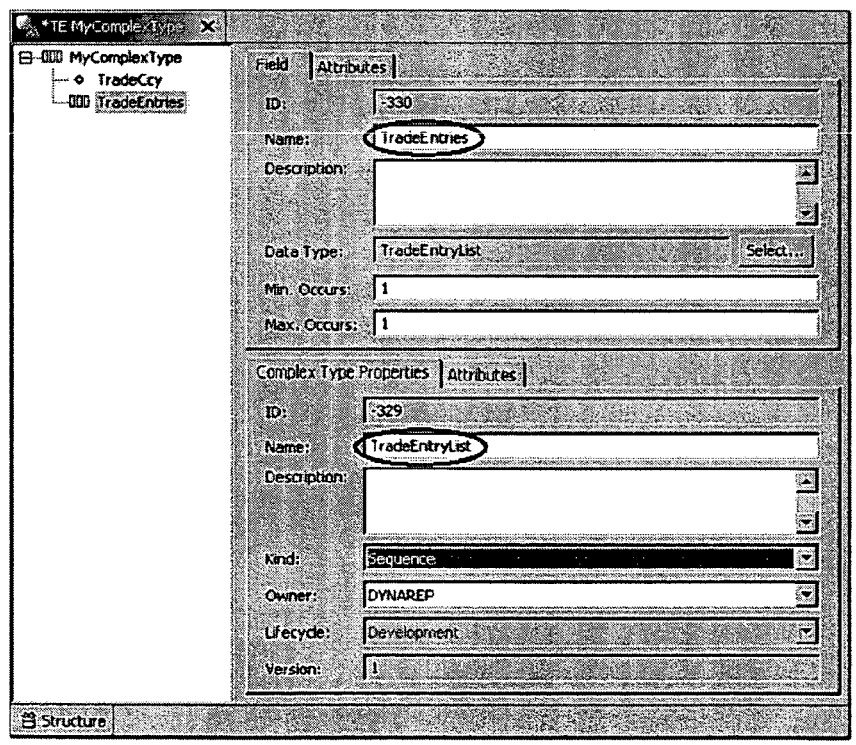

If, in the user interface of FIG. 21, the option "New Sequence Complex Type" is chosen, the user interface of FIG. 26 is displayed for creation of a new complex type. In the user interface of FIG. 26, the new complex type may be given a characteristic name and the parameter "Kind" is preset to "Sequence" (see FIG. 27). In a similar manner, the parameter "Kind" will be preset to "Choice" if the user selects the option "New Choice Complex Type" in the user interface of FIG. 21.

The modeling tool of the present embodiment not only allows for a creation of a new complex type, but also for the creation of a new data item (that will then also be stored in the repository database). In the modeling tool, data items are primarily used for the definition of service parameters. Every leaf in the input or output tree of a service will be based on a data item. In general, existing data items should be re-used as often as possible (as explained with reference to FIGS. 21 to 23). However, there may still be situations in which the creation of new data items is unavoidable. A new data item will always be a specific data item, meaning that it is created in a specific domain, but with its significance and use by other domains it may become a core data item. Core data items represent the company's main data dictionary.

Figure 28:
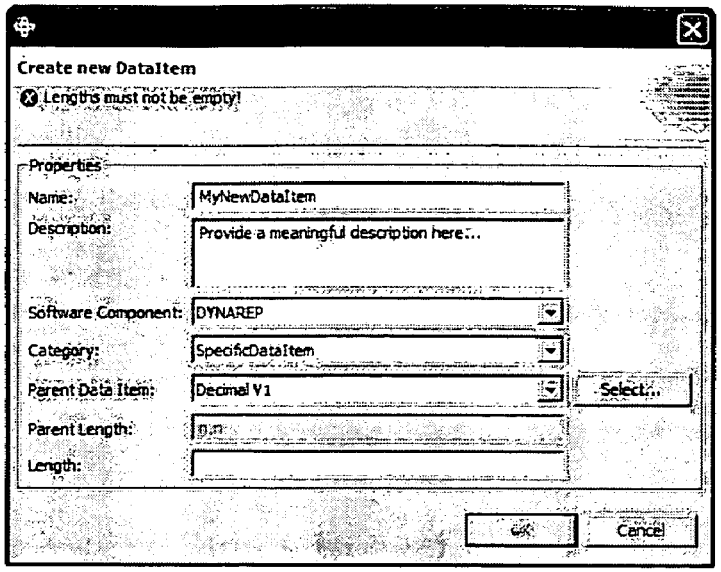

FIG. 28 shows a user interface that allows for the definition of data item properties for a data item that is to be newly created. The properties include a name, description, length, category, a parent and software component. In the present embodiment, data items must always belong to a particular software component. The initial properties are explained in more detail in the following table:

| | |
|---|---|
| Name | Name of the data item. The name should comply with predefined naming guidelines for data items |
| Description | A description for the new data item |
| Software Component | Allows for a selection of the software component owning the new data item. |
| Category | The choice given for a new data item is:<br>Core Data Item<br>Specific Data Item<br>Technical Data Item |
| Parent Data Item: | Except basic data items, all data items are derived from a parent data item. |
| Parent Length | Shows the length of the parent data item |
| Length | Length of data item. The length must not be empty. It must be less or equal the parent's length. It must not be zero. |

Once the parameters for a new data item have been specified, the "OK" button of the user interface of FIG. 28 may be clicked to create the date item. The data item may later be edited via the data items properties user interface shown in FIG. 29. This user interface has five tabs, namely "Basic", "Physical", "Business", "GUI" and "Lifecycle" as shown in FIGS. 29, 30, 31, 32 and 33, respectively.

Figure 29:
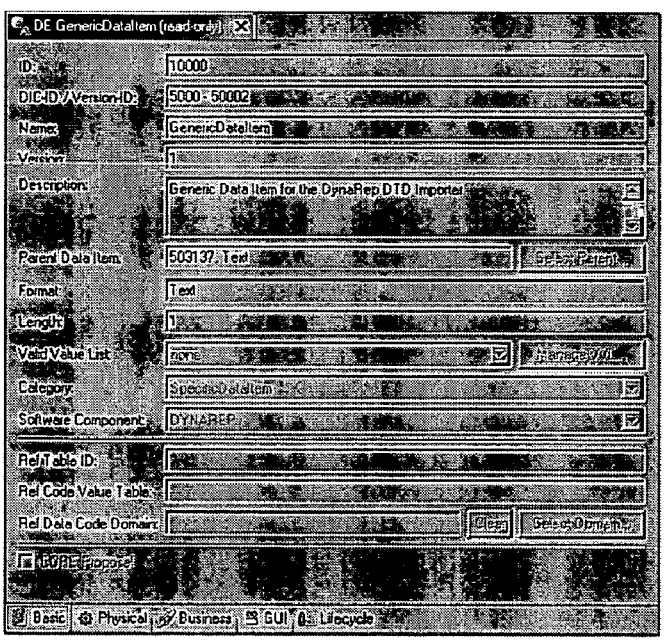

The "Basic" properties as shown in FIG. 29 include the following:

| | |
|---|---|
| ID | Internal identification, not changeable |
| DIC-ID/Version-ID | Identifier |
| Name | (English) name of the data item |
| Version | Version number |
| Description | Data item description |
| Parent Data Item | Every data item must be based on another data item (except basic data items |
| Format | Valid formats may be defined elsewhere |
| Length | Valid lengths may be defined elsewhere |
| Valid Value List | A list of valid values. |
| Category | A newly created data item is always a specific or technical data item. The data manager can decide to change it to a core data item. |
| Software Component | Software component owning the data item |
| Ref Table ID | Codes are kept in reference tables; this is its identification |
| Ref Code Value Table | Name of the table where the reference values are stored |
| Ref Data Code Domain | Name of the Code Domain which will be used to resolve the value, if the DataItem represents a code. When clicking on "Select Domain . . .", a dialog pops up where the Code Domain can be selected. |
| Core Proposal | Should be checked if the specific or technical data item should be promoted to a core data item. |

Figure 30:
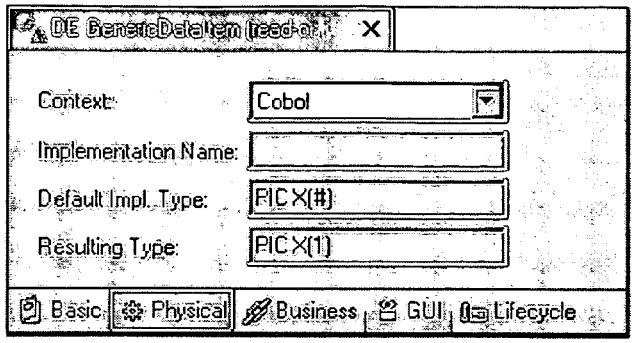

The "Physical" properties as shown in FIG. 30 allow for a specification of some implementation-specific information already on the model level in relation to the data item newly created. The physical properties that may be specified include the following:

| | |
|---|---|
| Context | Implementation environment; physical properties can be set for every context individually. |
| Implementation Name | Physical name of the data item in the selected environment (context) |
| Default Impl. Type | Selection of available data types in the selected environment (context) |
| Resulting Type | Result of the default type and the length of the context independent DI definition. This type is used during generation of artifacts for a certain context. |

Figure 31:
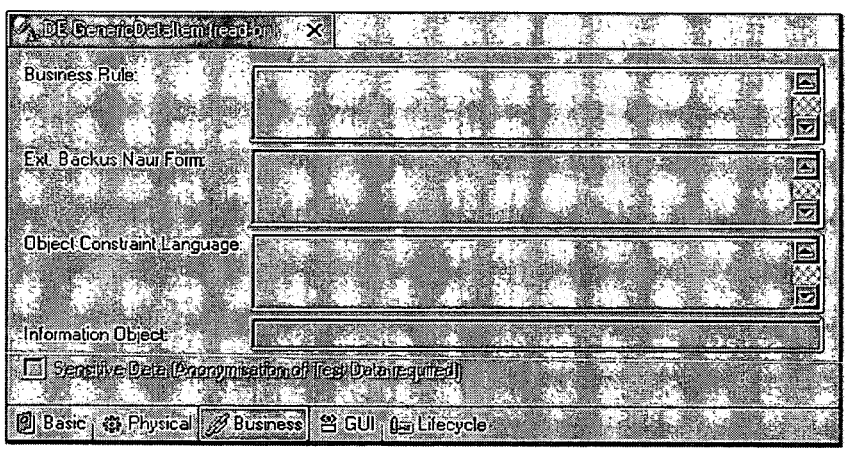

The "Business" (or application) properties as shown in FIG. 31 include the following:

| | |
|---|---|
| Business Rule | One or more rules defining valid values, underlying standards or inside structure of a data item; includes syntactical and semantical validation for data items. |
| Ext. Backus Naur Form | Formal definition about inner structure of a data item according to ISO-EBNF (production rules) |
| Object Constraint Language | Formal description of constraints, based on declarative semantics according to OCL (à UML) |
| Information Object | Information object from Application Architecture to which the data item belongs |
| Sensitive Data | Defines if values are subject to anonymization for test data |

Figure 32:
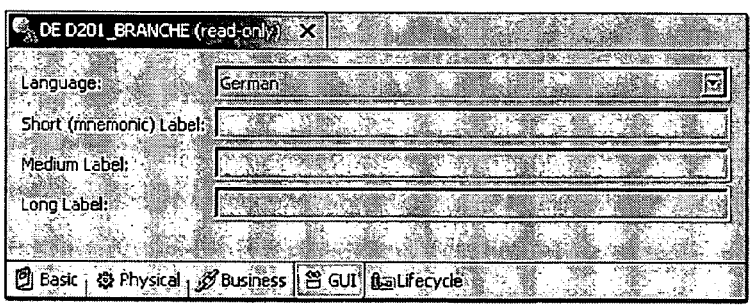

The "GUI" properties as shown in FIG. 32 are used to control the presentation of data items in the respective user interfaces. Care will be taken that data items are always shown to the user in the same way and with the same labeling. The "GUI" properties include the following:

| | |
|---|---|
| Language | Informal specification of business rules |
| Short Label | Label in GUI (short version) |
| Medium Label | Label in GUI (medium version) |
| Long Label | Label in GUI (long version) |

Figures 33, 34:
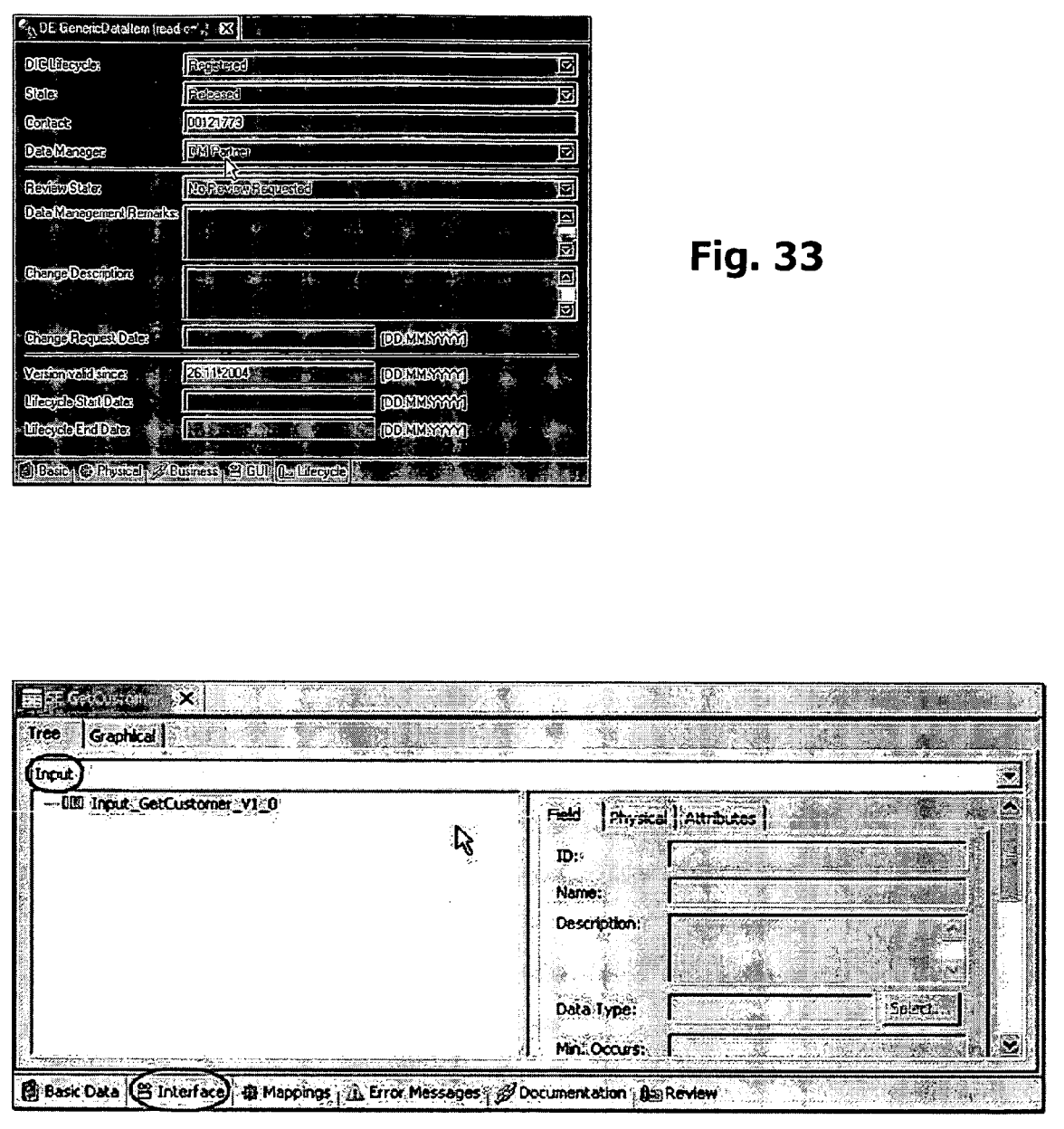

The "Lifecycle" properties as shown in FIG. 33 reflect the current state of the particular data item ("DI"). These properties are primarily used for data item reviews. Most of the settings can only be set and changed by a user having the corresponding authorization ("Data Manager"). The "Lifecycle" properties include the following:

| | |
|---|---|
| DIC Lifecycle | Lifecycle in Data Item Catalogue: Proposed, Registered, Inactive |
| State | One of the values for the data item's state: Under Development, Production, Inactive |
| Contact | Initially the GPN of the Data Manager: The person to ask about the business meaning of the DI. |
| Data Manager | The Data Manager is inherited from the parent data item when you create a new data item. |
| Review State | The following values are possible: No Review Requested, Review Requested, Review in Progress, Reviewed and Accepted, Reviewed and Rejected, Accepted Pre-Version |
| Data Management Remarks | Remarks normally given during review |
| Change Description | Description of the latest change |
| Change Request Date | Date of the latest request for change |
| Version valid since | Date from when the current data item version is valid |
| Lifecycle Start Date | Start of the DI's life as a useful member of society |
| Lifecycle End Date | Date when the DI gets invalid |

Input and output parameters of a service are composite tree structures (in the form of "complex types"). They are displayed in the modeling tool in a similar manner like folder structures in a file system. That is, complex types correspond to folders, while fields (or attributes) correspond to files. Every field must be assigned to a data item.

The modeling tool permits the specification of input and output parameters (i.e. the creation of attributes) either via a tree editor (step 2a in FIG. 11) or, alternatively, via a graphical editor (step 2b in FIG. 11). In the following, the tree editor will be discussed first with reference to the user interfaces shown in FIGS. 34 to 36.

Figure 35:
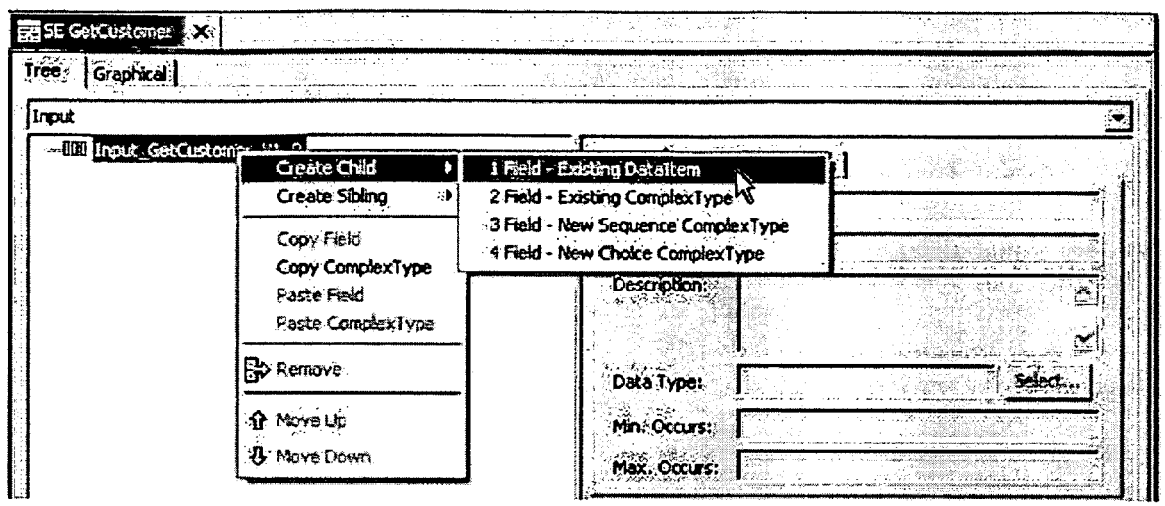

Opening a service and successively selecting the "Interface" (see FIG. 14) and the "Tree" tabs opens the editor for input and output parameters shown in FIG. 34. The pull-down menu in the upper part allows for a switching between "Input" and "Output". The respective structure of the input or output complex type is shown in the left frame. In the right frame, the properties of the selected field can be described. Right-clicking of an element in the complex type shown in the left frame creates new input or output fields (FIG. 35). Several possibilities are offered when selecting "Create Child" or "Create Sibling" (see also FIG. 21 and corresponding description):

| | |
|---|---|
| Field—Existing Data Item | Inserts an attribute based on an existing data item |
| Field—Existing Complex Type | Inserts a structure based on an existing complex type |
| Field—New Sequence Complex Type | Inserts a new complex type whose children form a sequence |
| Field—New Choice Complex Type | Inserts a new complex type. In aconcrete instance of the complex type, only one of its children is present |

Inserting a sibling creates an element on the same level; inserting a child creates a child to an element. A leaf attribute, based on a data item type, can, of course, not have any children.

Figure 36:
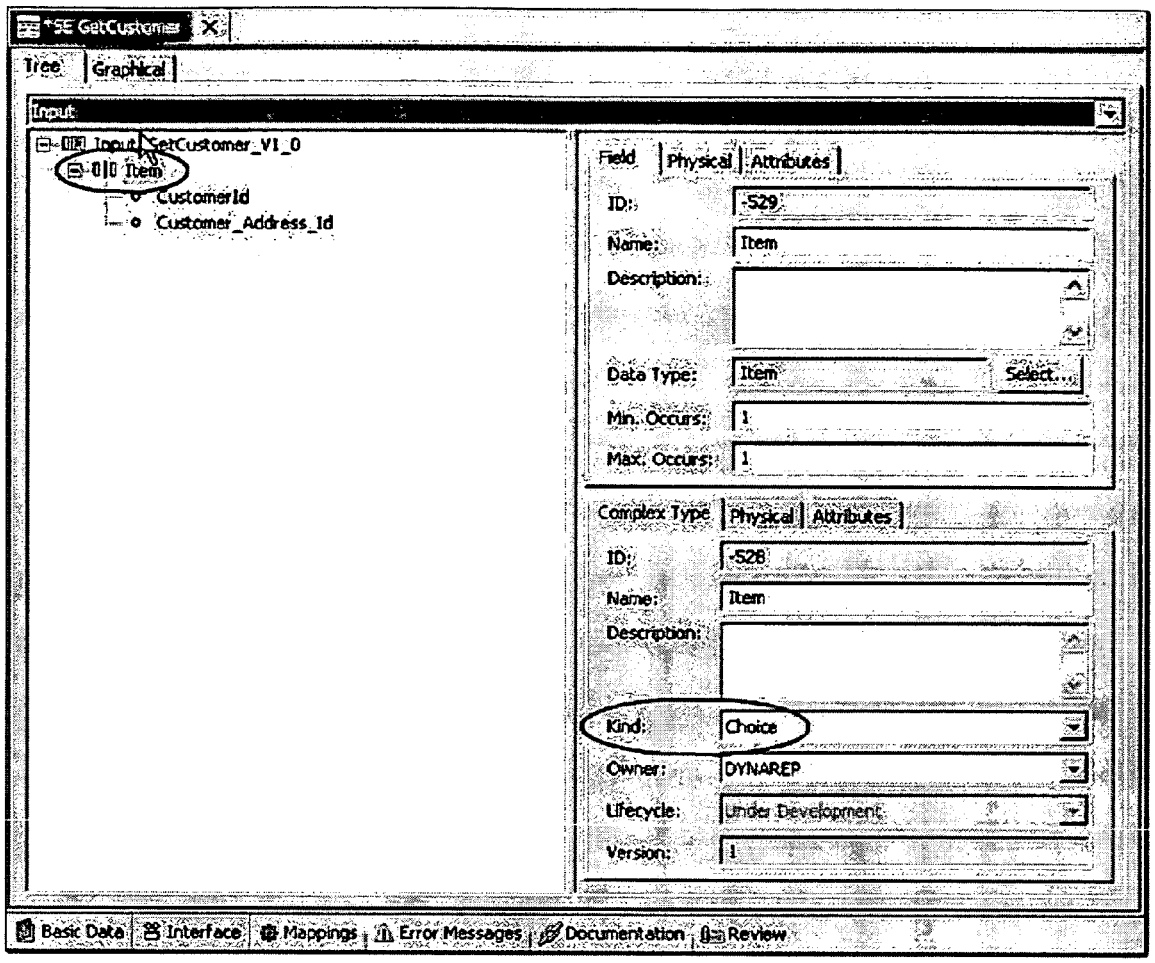

It should be noted that no new data items can be created in the editor. New data items can only be created in the data item explorer as discussed above in context with FIGS. 28 to 33. Further, it is not possible to change the properties of a data item directly in the service or complex type editor. The user interface of FIG. 36 shows an example of an "Input" complex type with an element of the "choice" complex type as displayed by the tree editor.

Figure 37:
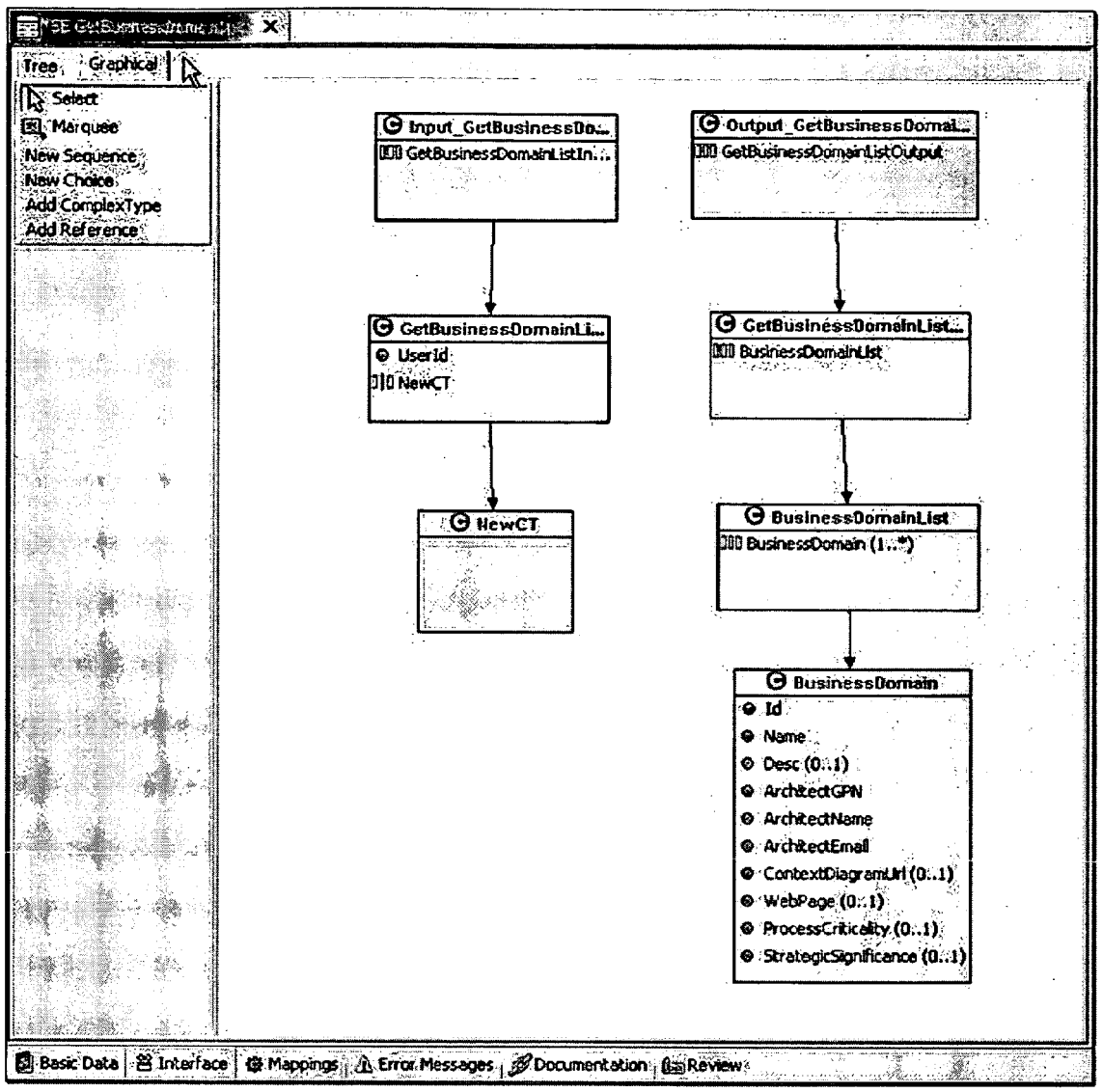

Opening a service and successively selecting the "Interface" (see FIG. 14) and the "Graphical" tabs opens the graphical editor for input and output parameters shown in FIG. 37. In the graphical editor of FIG. 37, input and output parameters are shown in parallel in their respective hierarchical structure. Different kinds of complex types may graphically be represented in different colors.

The toolkit on the left side of FIG. 37 allows for a change of the interface with the following options:

| | |
|---|---|
| Select | Select one or multiple graphical objects |
| Marquee | Select objects by dragging up a rectangle |
| New Sequence | Drop a new sequence complex type on the diagram |
| New Choice | Drop a new choice complex type on the diagram |
| Add Complex Type | Drop an existing complex type on the diagram. |
| Add Reference | Add a reference from one complex type to another, i.e., add a field to the first complex type that uses the second complex type. |

Figure 38:
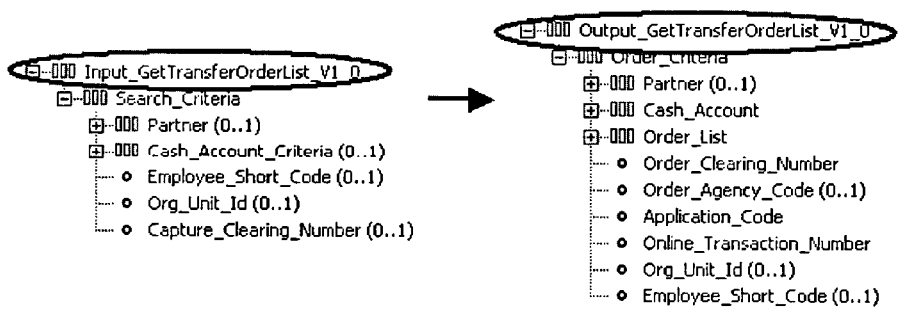

As has been mentioned above, complex types can be used as input and output parameters (or parameter sets) of a service. Mappings (step 3 in FIG. 11) now define how a complex type is transferred into another complex type and are thus primarily used for mapping the input parameters of a specific service to its output parameters as illustrated in FIG. 38 for two exemplary complex types. Mapping an input to an output complex type of a service means that one specifies the "algorithm" of the service. It also means that the output can directly be calculated from the input, without calling another service. Mappings are also used for mapping the input parameters of a specific service to database tables or for mapping output parameters of a first service to input parameters of a second service.

In the modeling tool, mappings are defined on a "Mappings" page of the service editor. In order to be handled correctly by the subsequent artifact generator, mappings have to adhere to certain naming conventions, depending on the mapping type. For each mapping a developer can define a name. There are no technical restrictions on these names, but special characters should be avoided as the names will also be used as names in the generated code. If there is more than one mapping in a particular entity service, the same name should be used for all the mappings. In process services, the same name should be used for two substep mappings.

In order to create a new mapping, the "Add" button in the "Mappings" page (see FIG. 39) of the service editor has to be clicked. The "Mappings" page can be reached via the "Mappings" tab of the user interface shown in FIG. 14. In response to activation of the "Add" button, the main properties of the mapping can be defined by selecting a mapping type via a window as illustrated in FIG. 40. The mapping kind influences the generation of the service code frame (the "construct" that can be manually completed if required). It does not influence the functionalities of the service editor (such as mapping source, mapping target, mapping operation).

In the present embodiment, there are six kinds of mappings: Input, Output, Restriction, Substep Input (Invoke or Call), Substep Output and Internal Mapping. The properties of these mapping kinds are summarized in the following table:

| | |
|---|---|
| Input | The service input or a subset is used without any restrictions |
| Output | A complex type is mapped to the service output without restrictions |
| Restriction | A constraint is set on the mapping of the two complex types; in SQL this corresponds to a WHERE clause |
| Substep—Input INVOKE | Must be used when calling a service to provide the input parameters for this service call |
| Substep—Input CALL | Can be used when calling a service to provide the input parameters for this service call (within z/OS for the same Business System or Shared Services only). |
| Substep—Output | Must be used to retrieve the output parameters of a service call |
| Internal Mapping | Helper mapping for internal processing |

Figure 41:
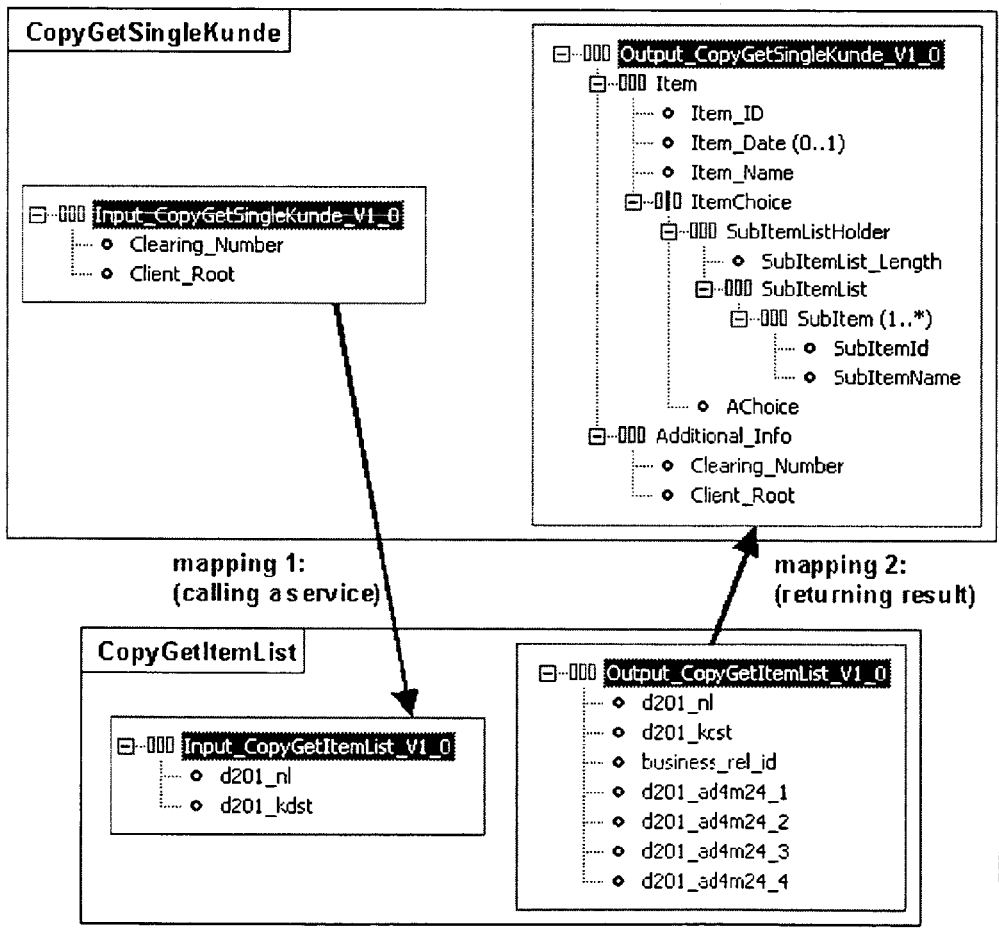
Figure 42:
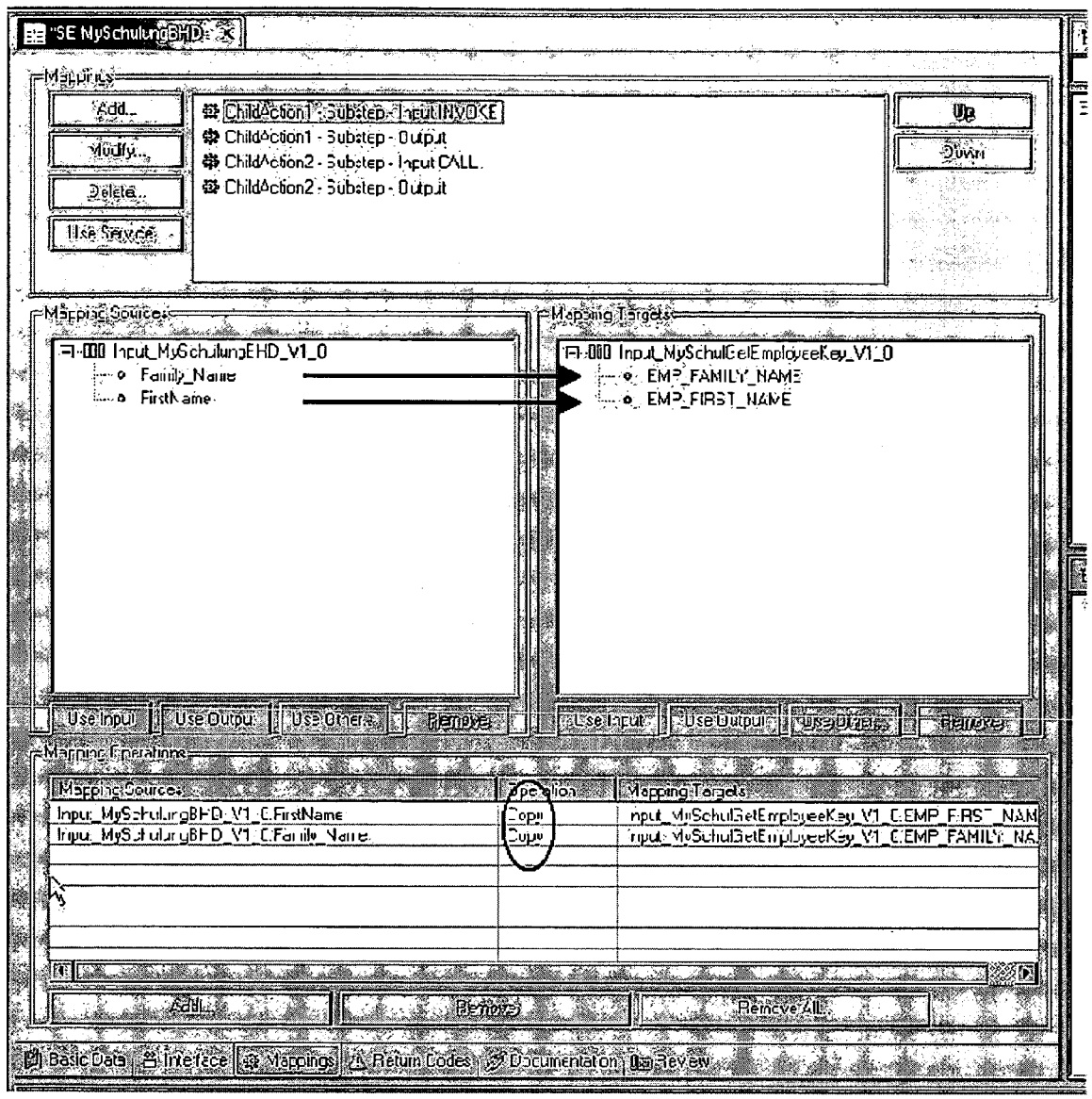

As mentioned above, mappings may also be used as a vehicle for transferring data between two individual services. An exemplary scenario is illustrated in FIG. 41. The example shows how the service "GetItemList_V1_0" (A) is called within the service "GetSingleKunde_V1_0" (B). A first mapping is used for calling service "B", and a second mapping is used for returning the result of service "B" to service "A". A corresponding user interface is shown in FIG. 42. First, the input complex type of service "A" is mapped to the input complex type of service "B" in order to provide the necessary information to service "B". Next, the output complex type of service "B" is mapped to the output complex type of service "A". This means that the return parameters from the called service "B" are transferred to the output parameters of "A" (see FIG. 43).

Figure 39:
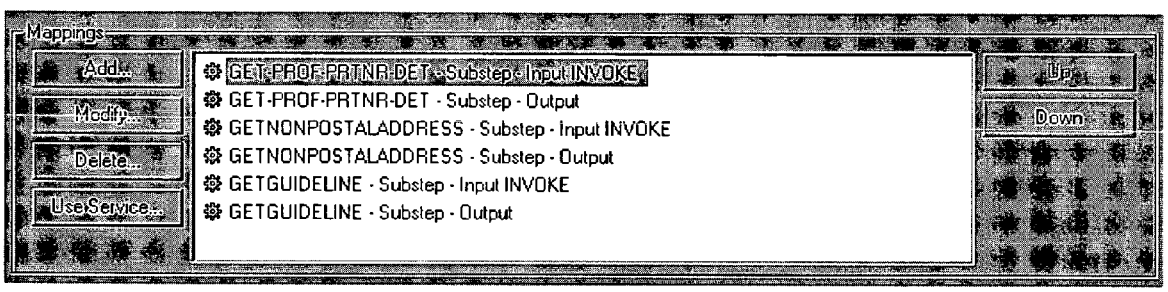
Figure 40:
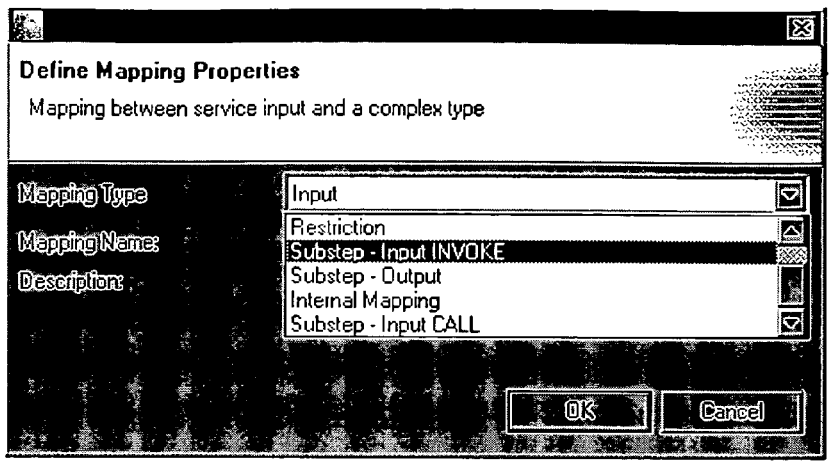
Figure 43:
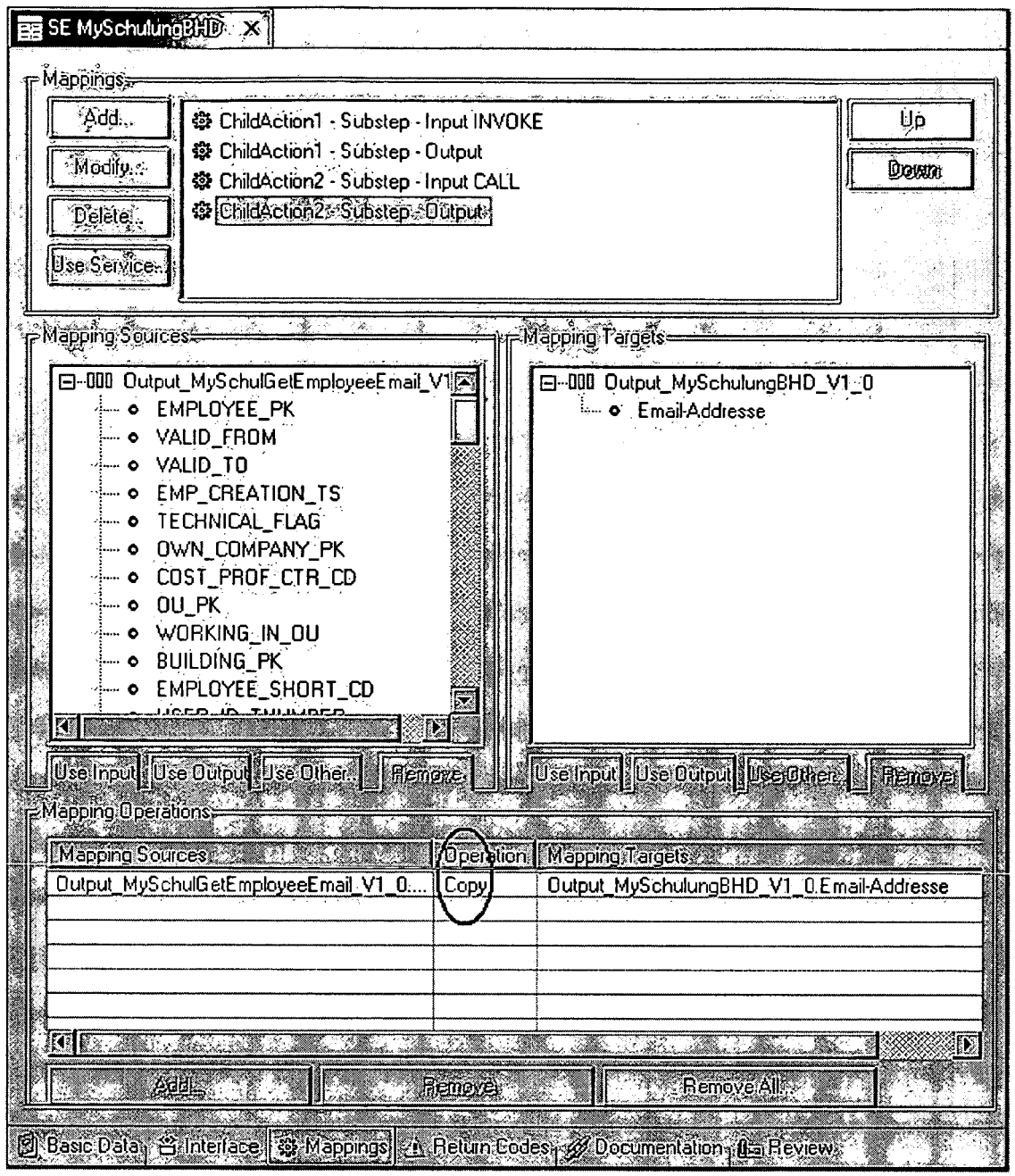
Figure 44:
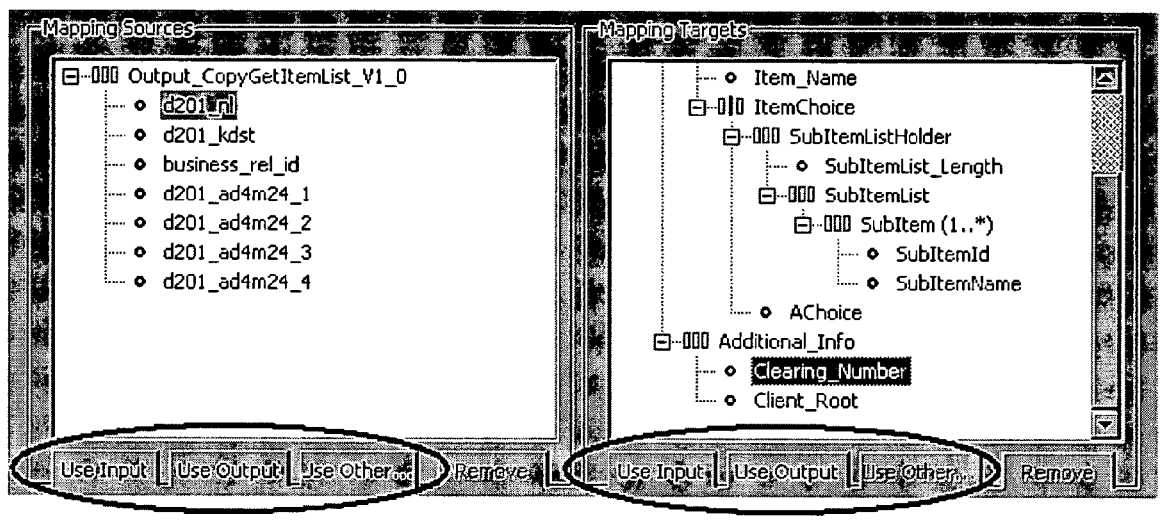

Mapping sources and mapping targets can either be chosen manually or via the "Use Service" button of the user interface shown in FIGS. 39, 42 and 43. Then, a search dialog appears that permits the selection of a service as a substep. After the selection has been confirmed, the mapping sources and mapping targets are offered as shown in the user interface of FIG. 44. This user interface offers the following options:

| | |
|---|---|
| Use Input | Uses the service input |
| Use Output | Uses the service output |
| Use Other . . . | Uses another complex type. A search window is opened for finding the complex type |

Figure 45:
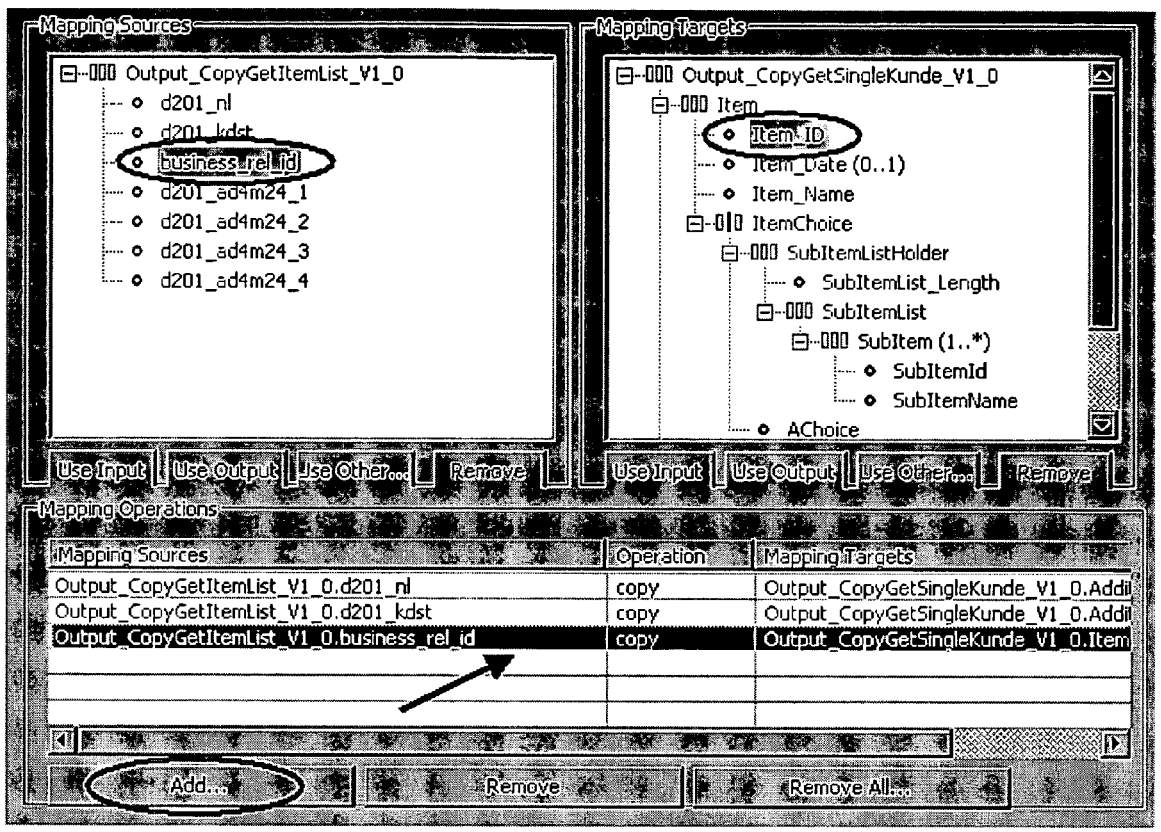

In addition to defining mapping sources and mapping targets, mapping operations have to be defined. A mapping operation defines how individual input fields are transferred to the output fields. FIG. 45 shows a user interface in which the copy operation is illustrated. Such an operation is for example useful for transferring data between a database, via one or more entity services and/or process services, and a presentation service.

In the user interface of FIG. 45, a mapping may be added to a service by clicking one field in the mapping source section, one field in the mapping target section, and by activating the "Add" button. If required, more complex operations could be defined as well.

The modeling tool additionally permits error messages management for a service that is to be modeled. Error messages management (step 4 in FIG. 11) will now be explained in more detail with reference to the user interfaces of FIGS. 46 to 52.

Figure 46:
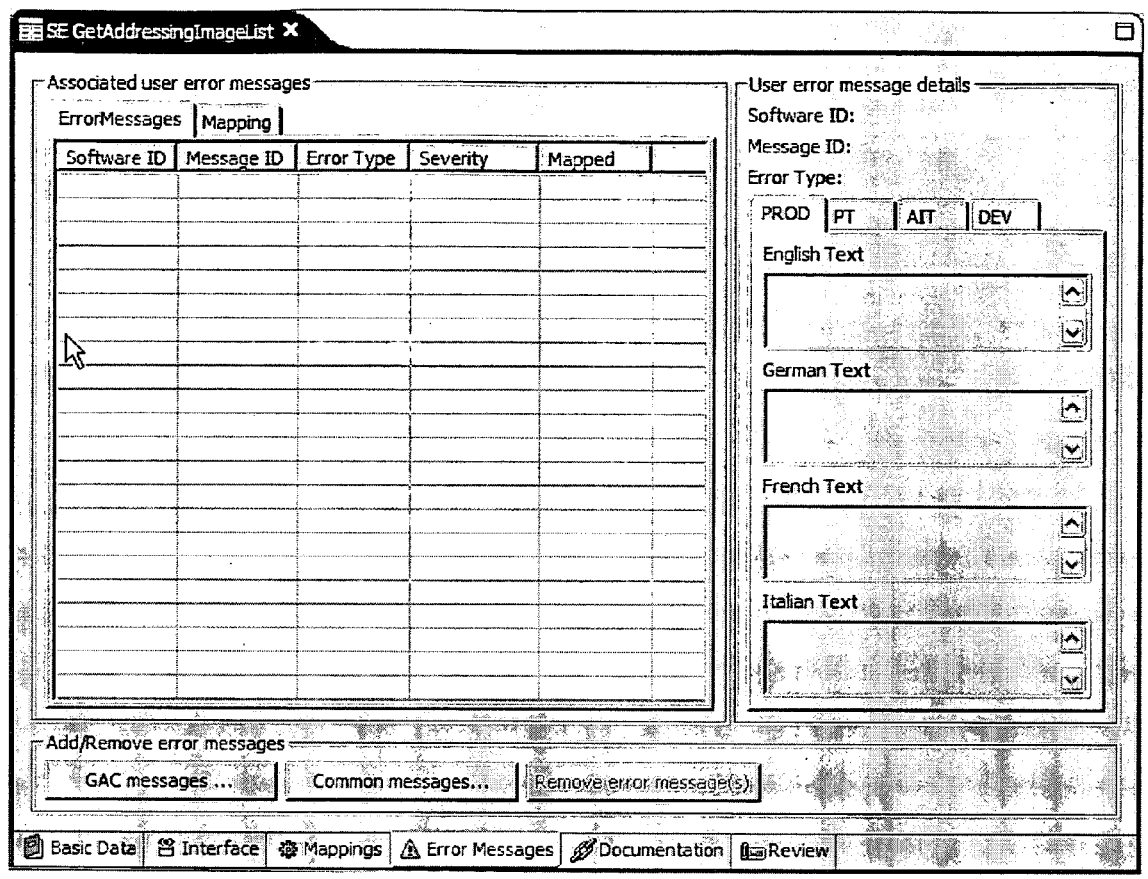

In the service editor start page as illustrated in FIG. 14, the "Error Messages" page (shown in FIG. 46) can be reached via the corresponding "Error Messages" tab. Error messages already defined for the particular service are displayed automatically in the table "Associated user error messages". The user interface of FIG. 46 shows the page before any messages have been associated with the exemplary (business) service GetAddressingImageList.

Figure 47:
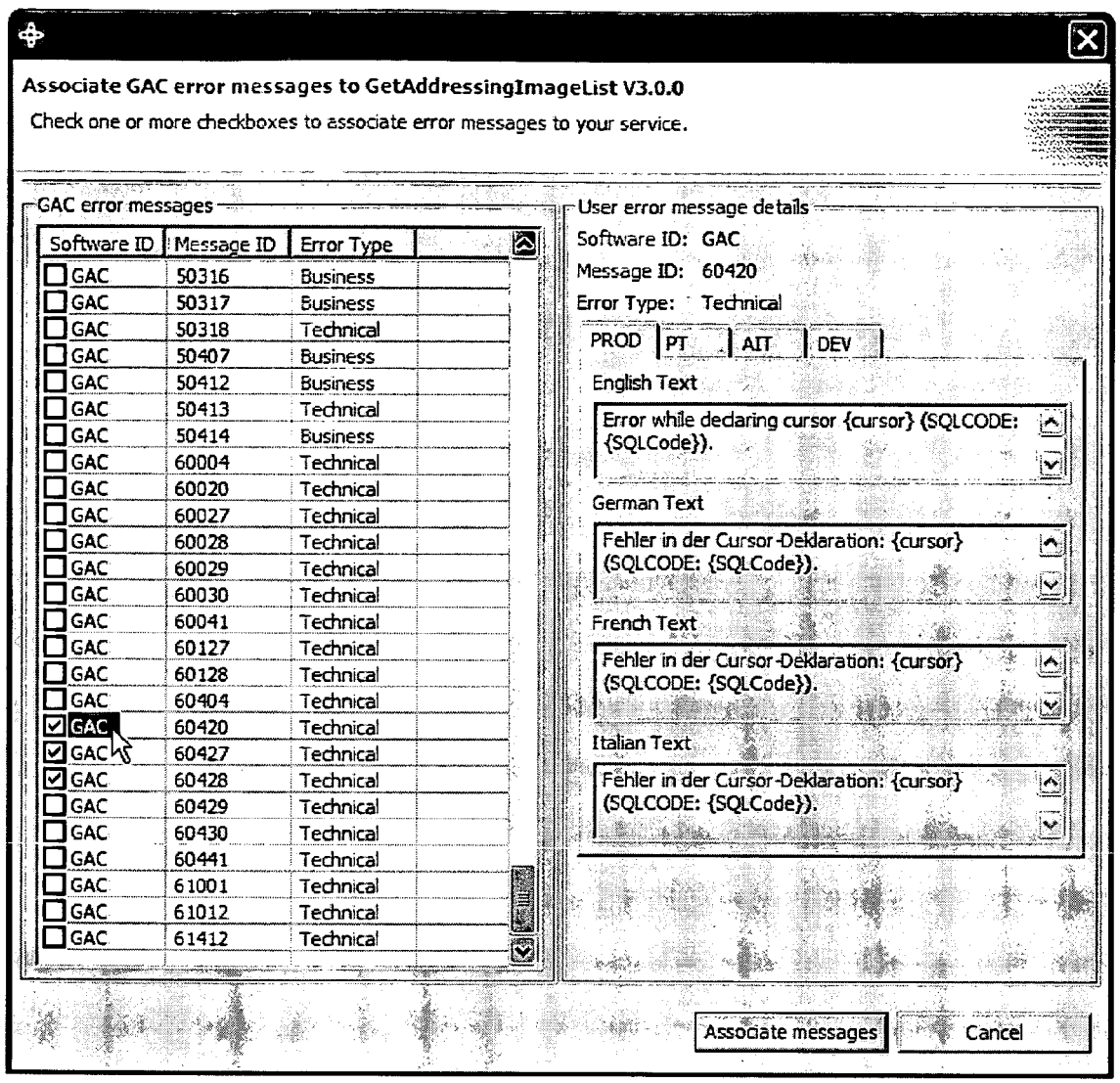

Two types of message can be associated with a business service: Subcomponent-specific messages and Common messages. Subcomponent-specific messages can be associated with the service by clicking the button "GAC messages . . . ", where <GAC> is the software subcomponent ID in which the services is defined. Likewise, Common messages can be associated with the service by clicking the button "Common messages . . . ". Clicking on either of these two buttons results in a dialog user interface as shown in FIG. 47.

The table on the left hand side of the dialog user interface shows all possible messages associated with the subcomponent (or, in the "Common messages" scenario, of Common messages). Selecting a row of the table displays a summary of the message on the right hand side of the dialog. It is possible that the user interface displays no messages, and instead displays an empty table indicating that no error messages have been defined for the subcomponent in question.

Messages already associated with the service will already be checked when the dialog is opened. To specify that a message should be associated with the service, the checkbox of the message has to be marked. To specify that a message should be disassociated with the service, the checkbox of the message has to be cleared. Finally, to make the association, the "Associate messages" button has to be clicked.

Figure 48:
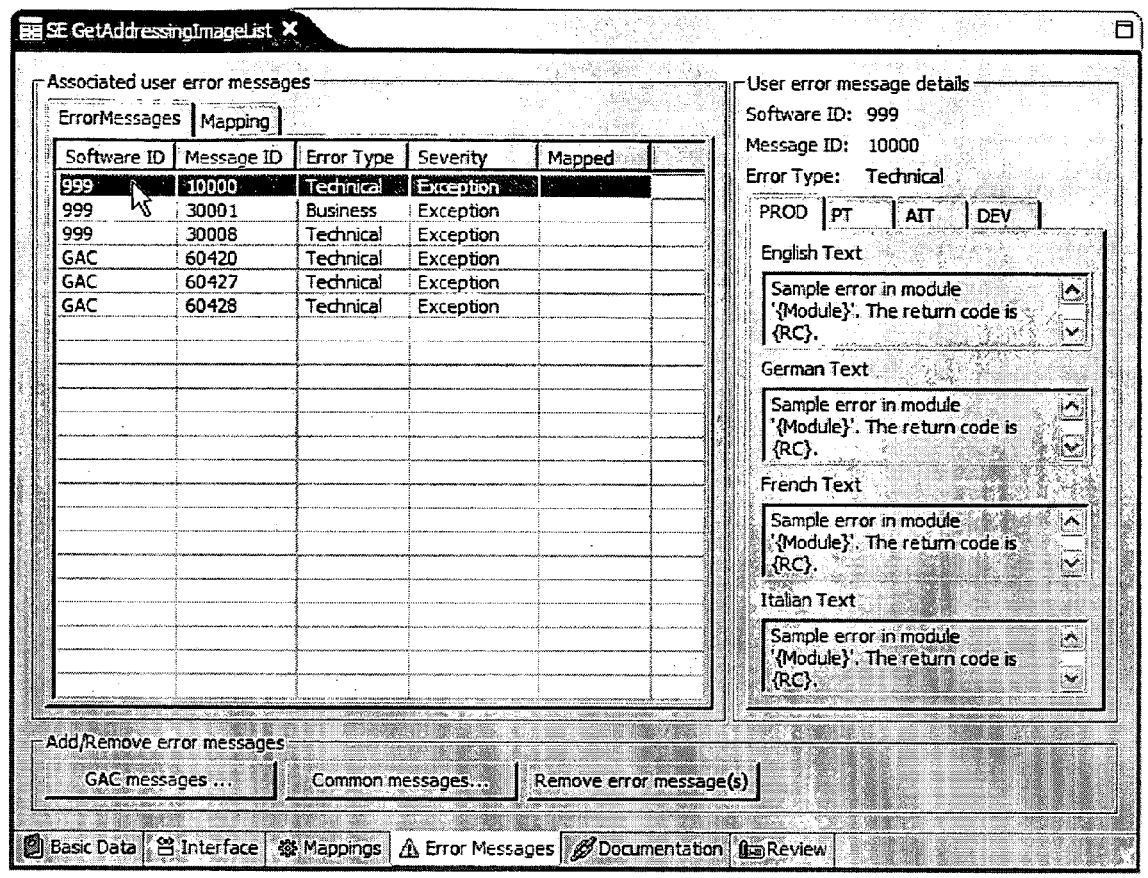

FIG. 48 shows the original editor screen after both subcomponent-specific and common messages have been added. The user interface as shown in FIG. 48 offers to indicated a "Message Severity". For each message, one of the following options may be selected: "Warning", "Exception" or "Severe"

Figure 49:
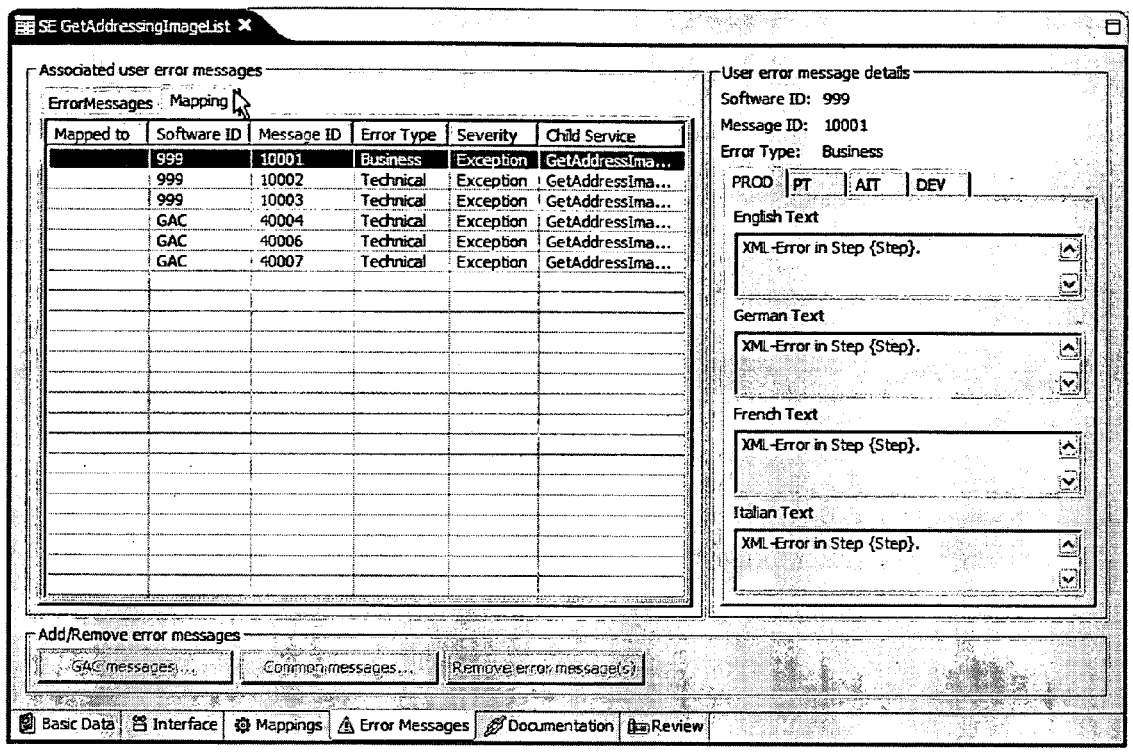
Figure 50:
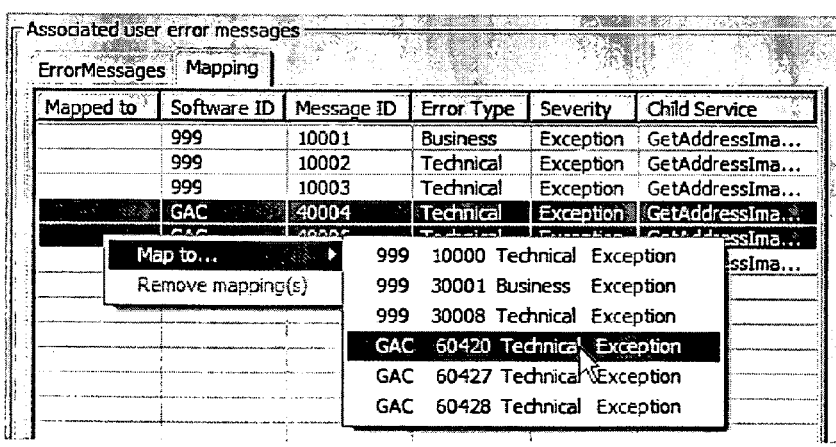

As mentioned above in context with mapping, a service may call additional services. These calls are defined in the "Mappings" tab of the service editor. After creating a service mappings, one may reopen the services that are to be called. In the tab "Mapping", all error messages of the called services are listed. The modeling tool offers the possibility of mapping these "child" error messages into any existing error message which belongs to the service in work as shown in FIG. 49. In this context, one or more child messages may be selected first, and then the option "Map to . . . " may be chosen and one error message can be selected out of the list as shown in FIG. 50. The child messages will be mapped to the selected message. After this action, the corresponding information will be displayed in the column "Mapped to" as shown in FIG. 51. On the tab "Error messages", all messages which map child messages are marked with a check-mark (see FIG. 52). Additionally, a mechanism is provided for removing mappings.

As an example, when generating service code for a business-oriented programming language such as Cobol™, for each error message the following comment will be written into the source:

*<SwscId>:<MessagId> <Productive text in english>

The corresponding output code can look as follows:

productive Application Error Messages to use for this Service:

---

*GAC:00001 Invalid input data: {Field}
*GAC:00011 CIF Root {Root}, {Clnr} don't exist or has no business relationship
*GAC:00012 Business relationship {Busrel-ID} don't exist
*GAC:00013 The relationship management {Role-OE-KWz} already exists Once the error messages have been specified for a particular service, top-down modeling is finished and the service model can be transferred to the generator for generating the required artifacts.

As an alternative to the top-down modeling approach discussed above, bottom-up modeling can be used (see FIGS. 5 and 10). This modeling type uses some previously defined artifacts to ensure automated fill-out of repository meta information. The automated processes are called wizards. The following wizards are defined for the modeling tool of the present embodiment:

| Wizard Name | Description |
| --- | --- |
| Create Presentation Service | Create Presentation Service Starting from a Business Component |
| Create Entity Service | Import Database Table and Create Entity Service |
| Create Service based on DTD | Import DTD |
| Create Service based on copybooks | Import Cobol ™ Copybook |

The operation of each of the four wizards illustrated in the above table will now be explained separately starting with the creation of a presentation service using an application component as a starting point.

Figure 53:
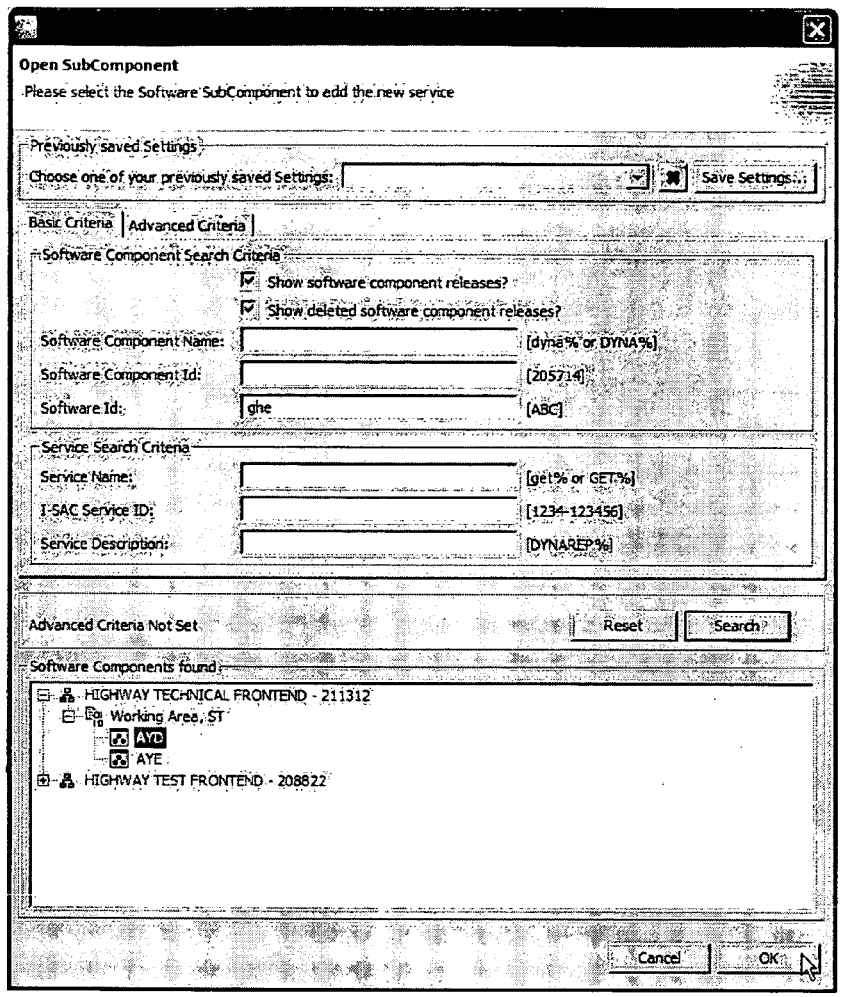

In order to create a presentation service from a backend application (business application or technical application), a presentation component must be created first. The modeling tool can create a presentation service (e.g. WPS) out of an existing application service. In this context, the application service has to be selected first. Once the application service has been selected, a container, i.e. the software subcomponent for the presentation service, has to be chosen. The user interface of FIG. 53 shows the search function provided by the modeling tool in this regard. Because only business applications and technical applications are allowed here, these kinds of software components are set automatically. The user interface of FIG. 53 permits a search for the desired software component. By clicking 'OK' a software component can be selected and assigned as a container for the presentation service.

Figure 54:
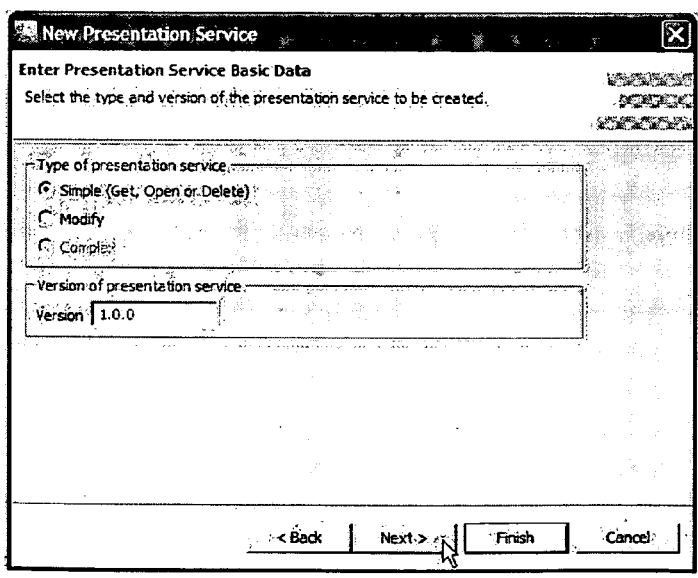
Figure 55:
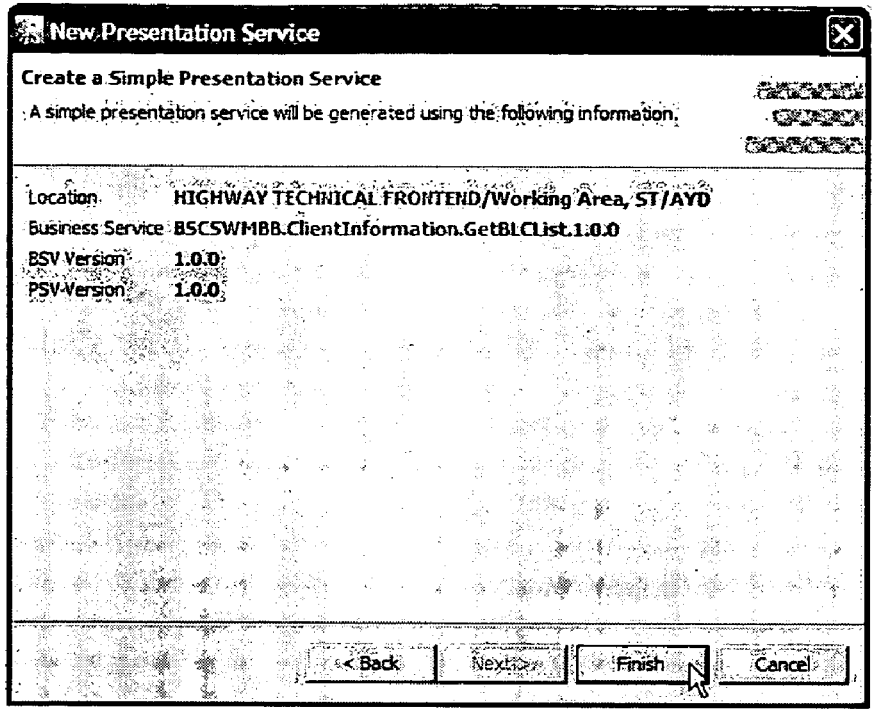
Figure 56:
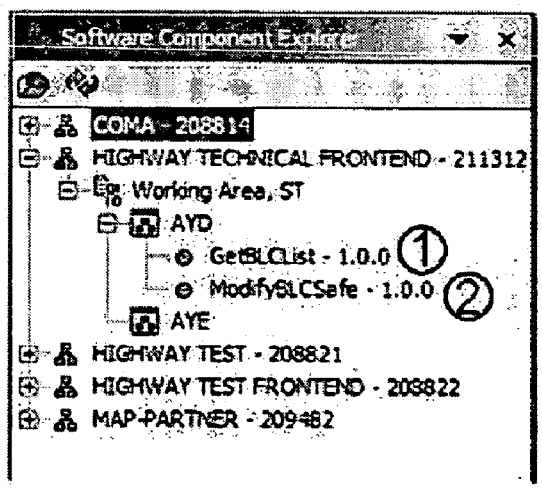

The presentation service type has to be selected next via the user interface of FIG. 54. The default presentation service type is "Simple". The version of the presentation service may additionally be entered. In case of a "Simple (Get, Open or Delete)" presentation service ("simple" e.g. with respect to the corresponding database operations), a confirmation dialog user interface as shown in FIG. 55 will be displayed. In case of more complex presentation services (such as a "Modify" presentation service), additional steps will have to be initiate that will not be discussed in more detail here. Clicking the "Finish" button initiates the creation of the requested presentation service. Thereby, elements (objects) are created for the presentation service in the repository database of the modeling tool and the presentation service appears in the software component explorer under the selected application and software subcomponent as shown in FIG. 56. In FIG. 56, the numeral (1) denotes a presentation service created following the instructions for simple presentation service, whereas (2) denotes a presentation service created following the instructions for a "modify" presentation service.

Figure 57:
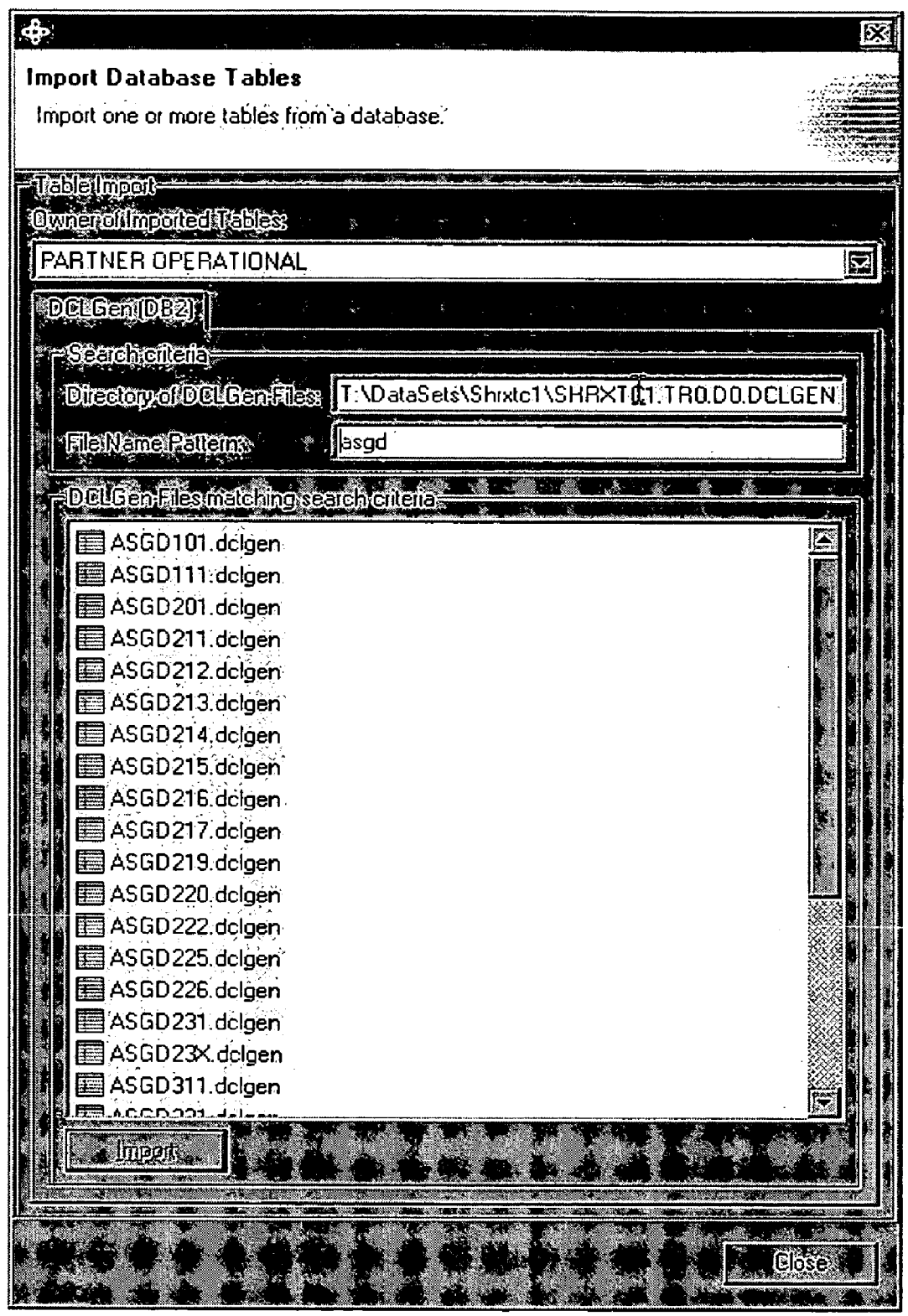

As mentioned above, for bottom-down modeling a further wizard is defined to import a database table and create an entity service. Based for example on a DB2 table definition, a so-called DCLGEN file can be generated containing a description of the table and a mapping to a Cobol™ copybook. This file can be used for an import of the table definition in the modeling tool. The DB2 table is represented in the modeling tool as a complex type. Creation of this complex type out of a DCLGEN file starts with a table selection dialog as shown in FIG. 57. The directory of DCLGen-Files should already contain the correct path, e.g.

"|DataSets|Shrxtc1|SHRXTC1.TR0.D0.DCLGEN".

Entering the DCLGEN file name pattern refreshes the list of tables available. Selection of one or more tables and clicking of the "Import" button initiates creation of a new complex type for each DCLGEN files.

Figure 58:
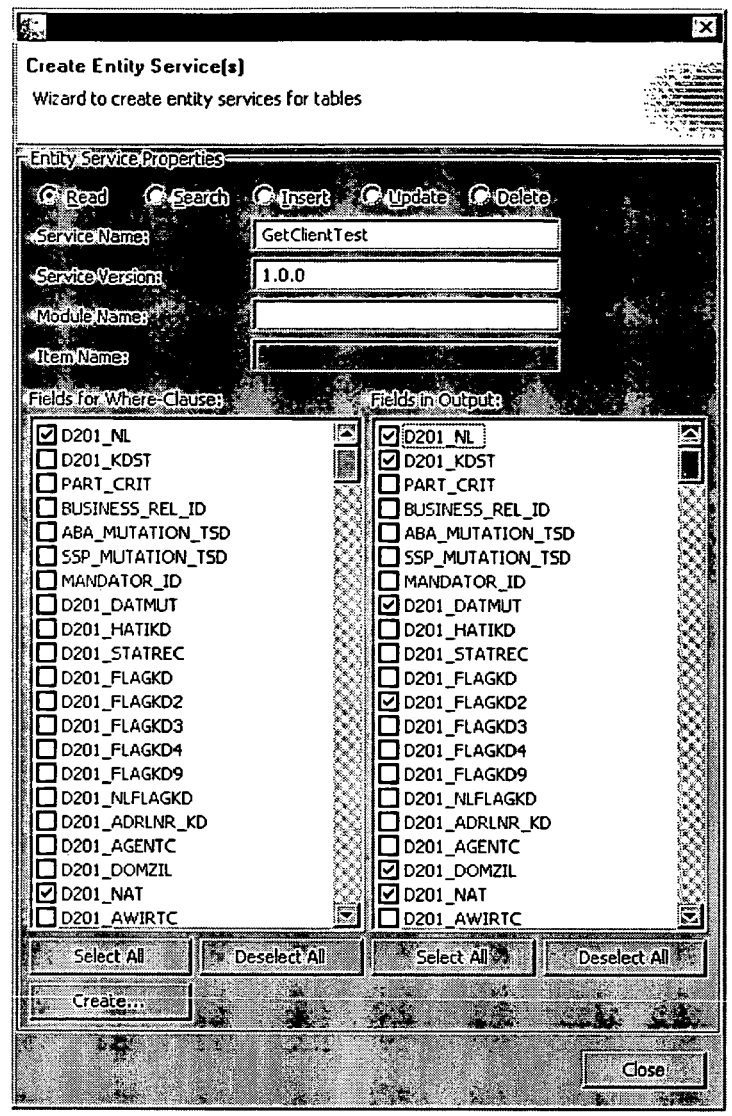
Figure 59:
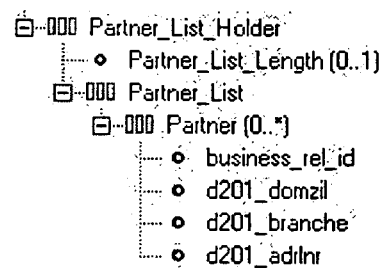

In a next step the one or more created complex types can be selected for the creation of an entity service (see FIG. 11a). The entity service for the selected complex types can be defined via the user interface shown in FIG. 58. The following options exist:

| | |
|---|---|
| Entity Service Type (Read, Search etc) | Type of Entity Service: Read ("Get") of an object Search ("GetList") for objects Insert ("Open") a new object Update ("Modify") an existing object Delete ("Close") an existing object |
| Service Name | Logical name of the entity service |
| Service Version | Service version |
| Module Name | Optional module name |
| Item Name | Only available if "Search" as service type has been chosen. Defines the name used for the result list. For example Item Name = "Partner" results in the complex type for the service's result list as shown in FIG. 59. |
| Fields for Where-Clause | Input complex type of the generated entity service. FIG. 60 shows the configuration for the example. |
| Fields in Output | Output complex type of the generated entity service. FIG. 61 shows the configuration for the example. |

Figure 62:
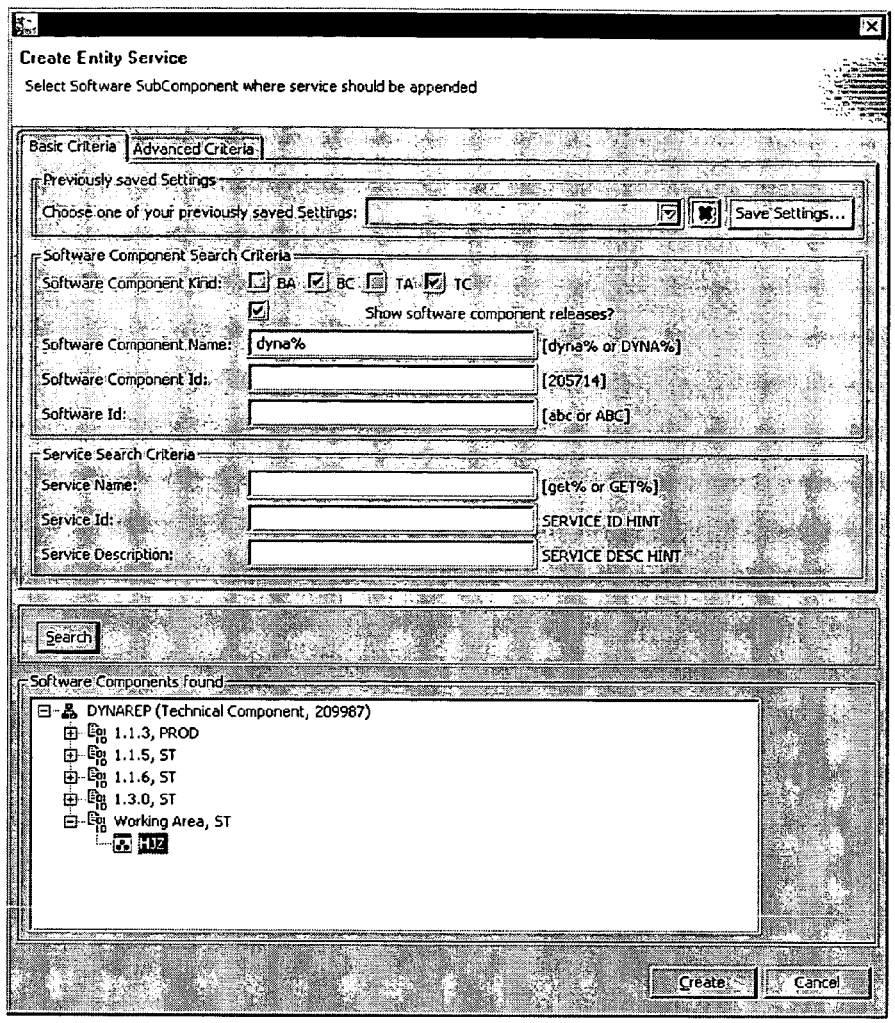
Figure 63:
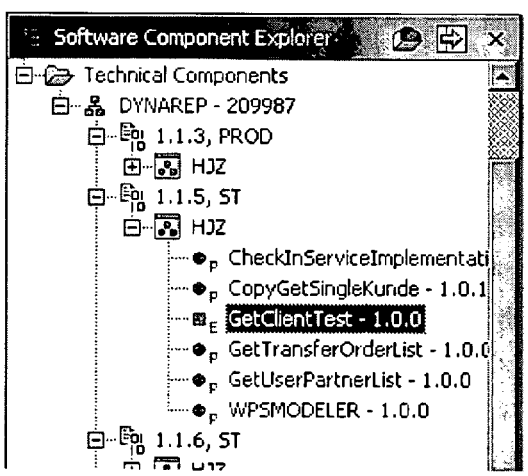
Figure 64:
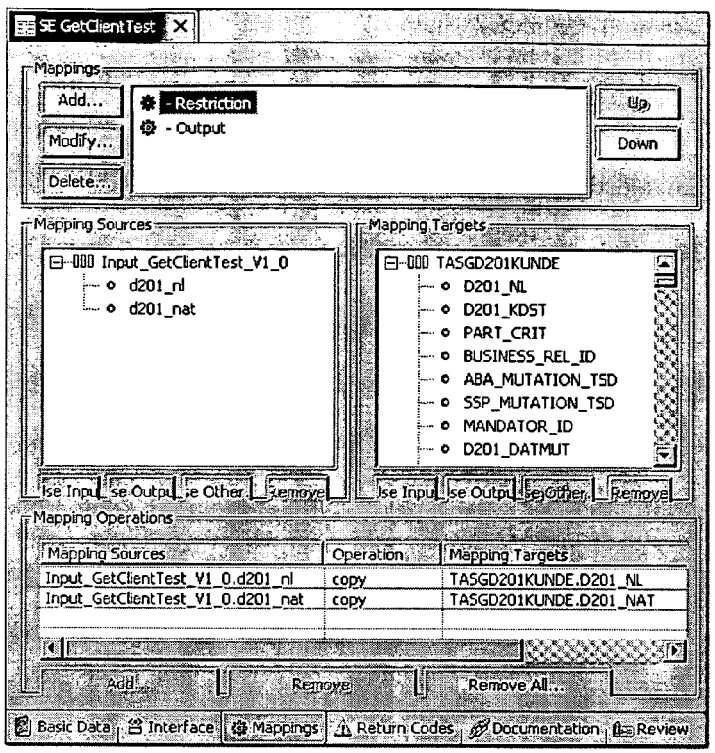
Figure 65:
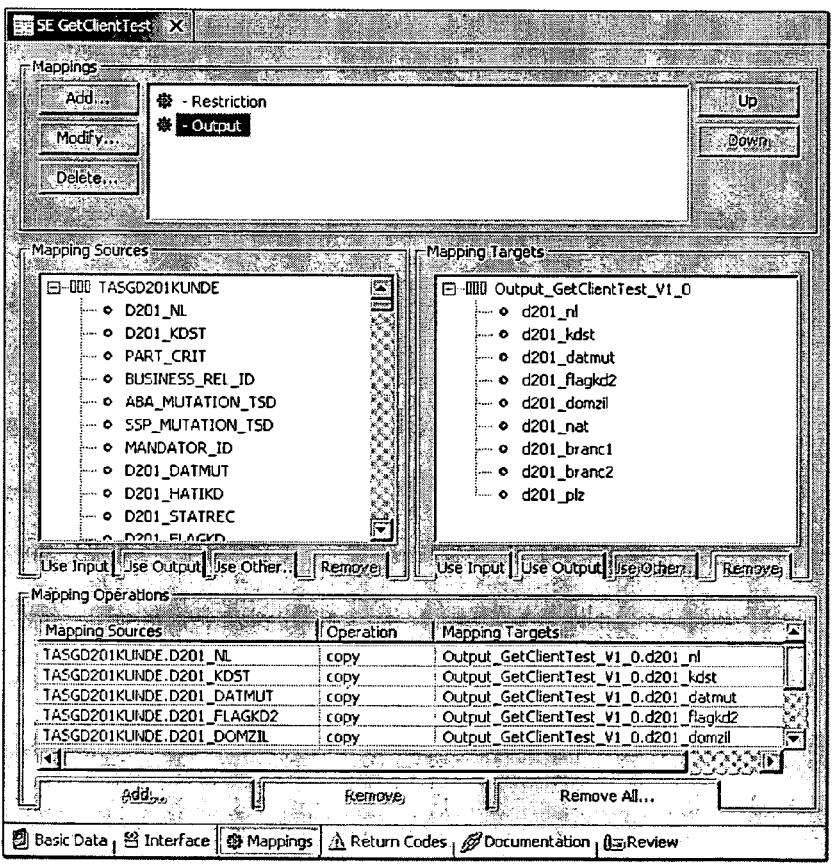

After the necessary data have been supplied, the software component release and the subcomponent in which the entity service will be created can be selected via the user interface shown in FIG. 62. The release can be opened by use of the "Search" button (if it is not already open). Clicking "Create" will create the entity service in the selected software subcomponent as shown in FIG. 63. If the newly created entity service is opened and the "Mapping" page is displayed, the two mappings are defined as shown in FIGS. 64 and 65.

Figure 66:
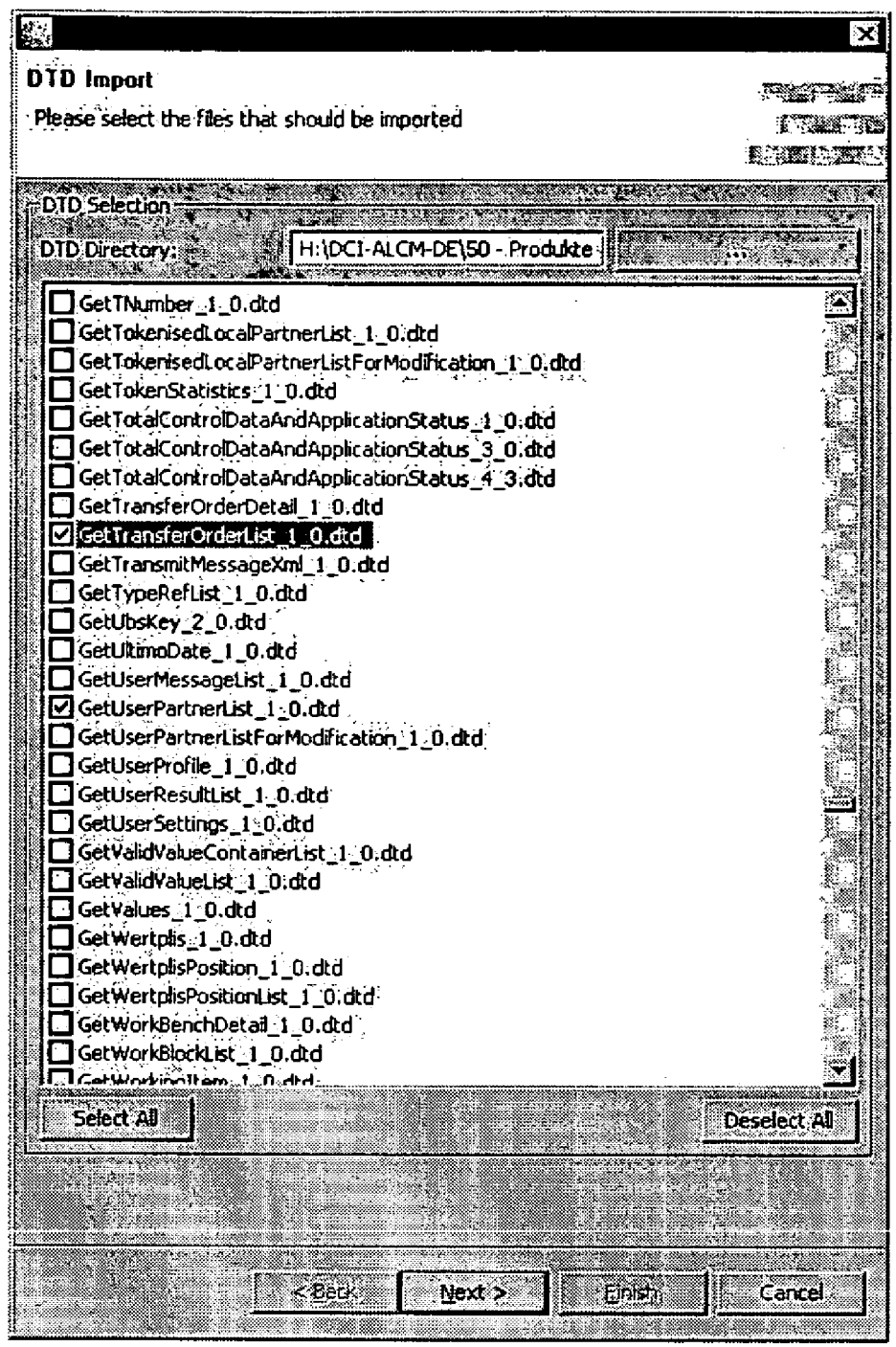
Figure 67:
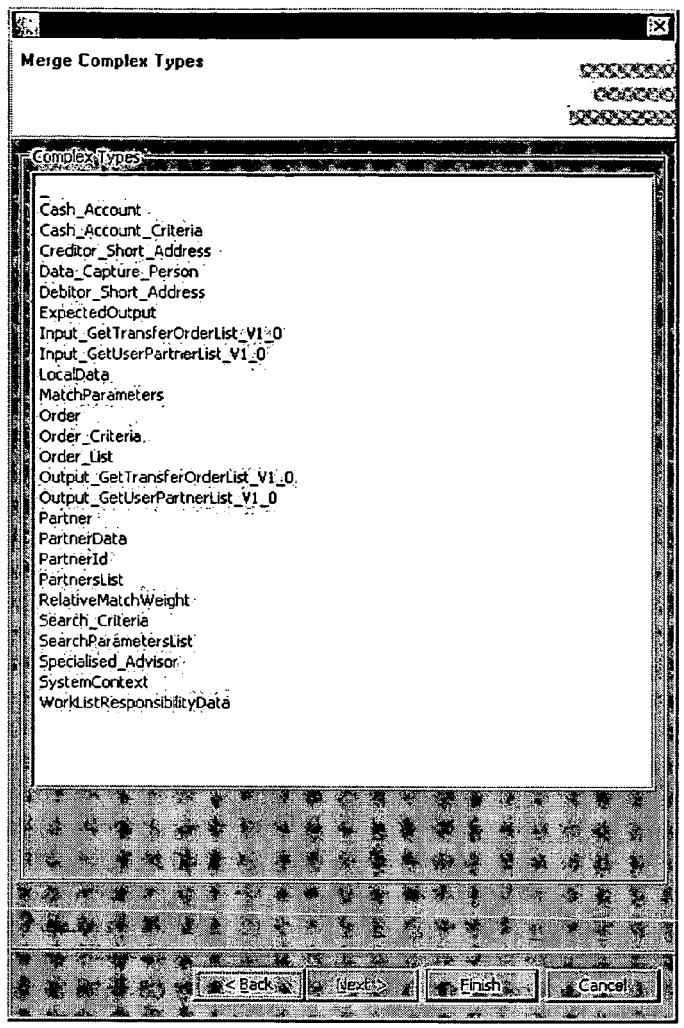
Figure 68:
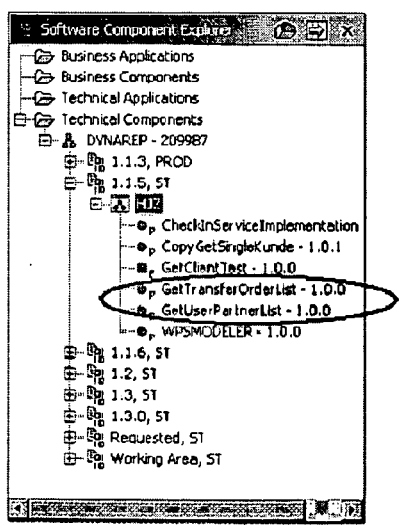

In the following, another example of bottom-down modeling will be explained with reference to the import of an existing DTD. To create a new process service, a software component release must first be opened in the software component explorer of the modeling tool. Then the software subcomponent which should provide the service(s) to be created (service provider) is to be selected. The user interface shown in FIG. 66 allows for a selection of one or more input files containing the existing DTD(s). After the selection has been performed, clicking on the "Next" button initiates parsing or the selected DTDs. The complex types that will be created are then displayed next via a user interface shown in FIG. 67. The import mechanism merges all complex types that are equivalent. Clicking on the "Finish" button starts the import process. After the import has finished, the services are shown in the software component explorer as illustrated in FIG. 68.

Figure 69:
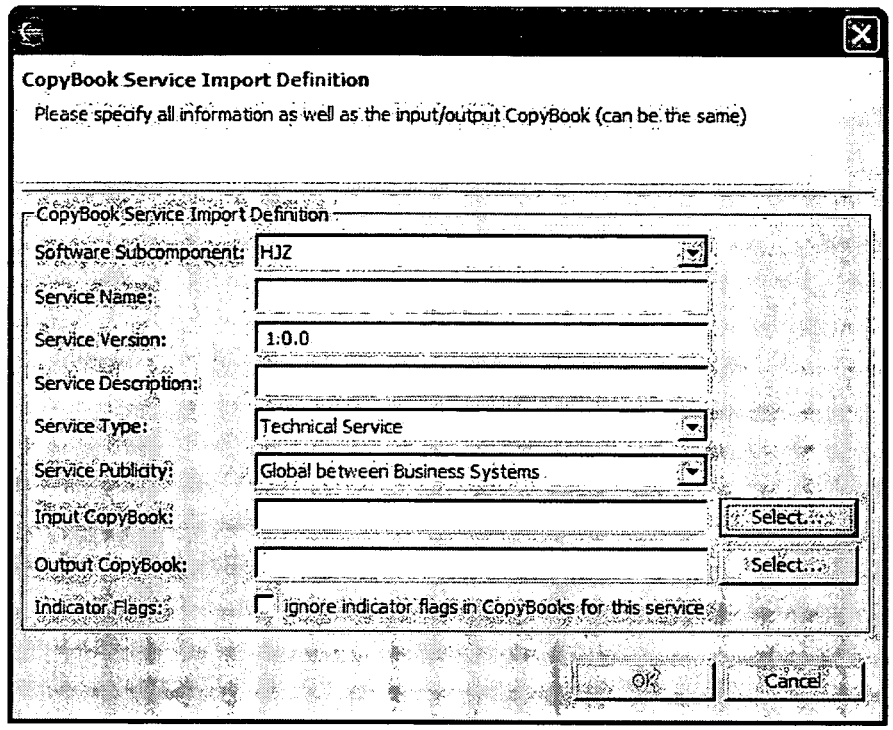

Now, a further example of bottom-down modeling will be explained with reference to the import of an existing copybook file. To create a new process service, a software component release must be opened in the software component explorer. Then the software subcomponent which should provide the service(s) to be created (service provider) has to be selected. The import of a Cobol™ copybook file can be performed via the user interface shown in FIG. 69. This user interface offers the following options.

| | |
|---|---|
| Software Subcomponent | Preset to the selected subcomponent. Clicking "Select . . . " opens an Open Subcomponent dialog |
| Service Name | Service name that will be created |
| Service Version | Service version that will be created |
| Service Description | Description for the new service |
| Service Type | Entity Read Service Entity Read List Service Entity Insert Service Entity Delete Service Entity update Service Batch Program/Job/Service Business Process Service—Request for Information Business Process Service—Request for Processing Service—View Technical Service |
| Service Publicity | Publicity of service. |
| Input CopyBook | Copybook structure for the input; see below |
| Output CopyBook | Copybook structure for the output |
| Indicator Flags | Ignores the indicator flags found in the selected Copybooks |

Figure 70:
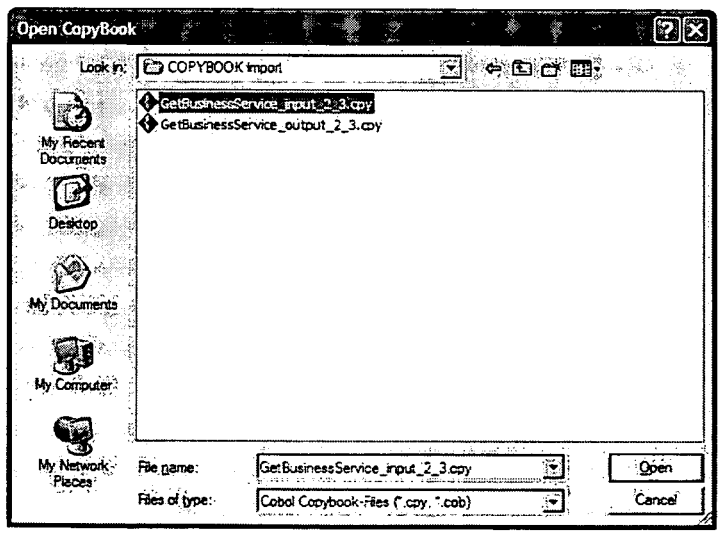
Figure 71:
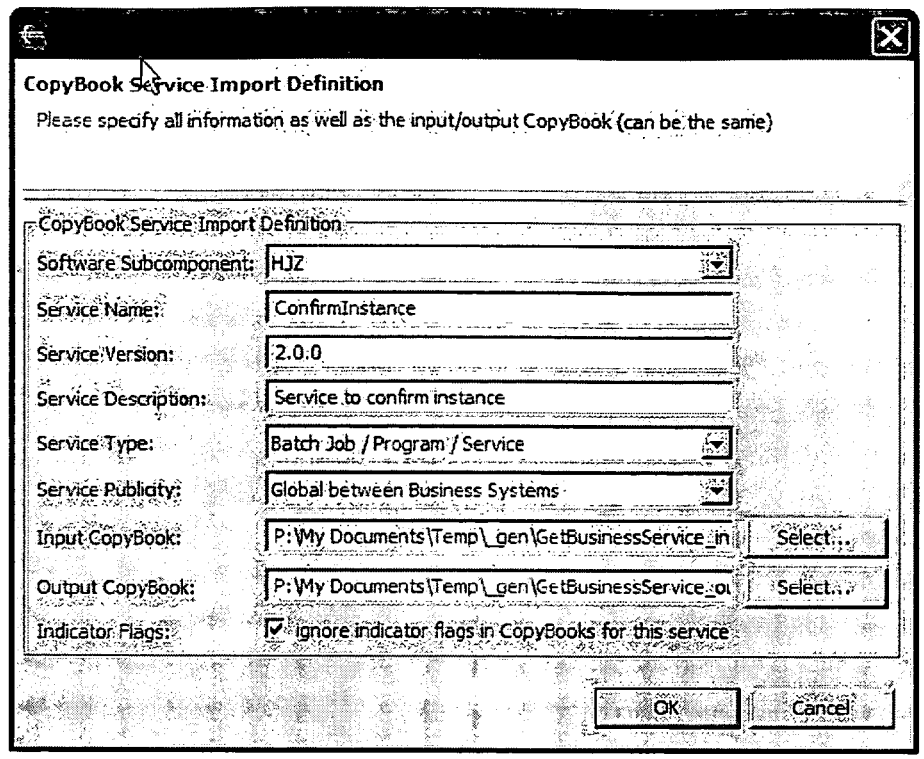
Figure 72:
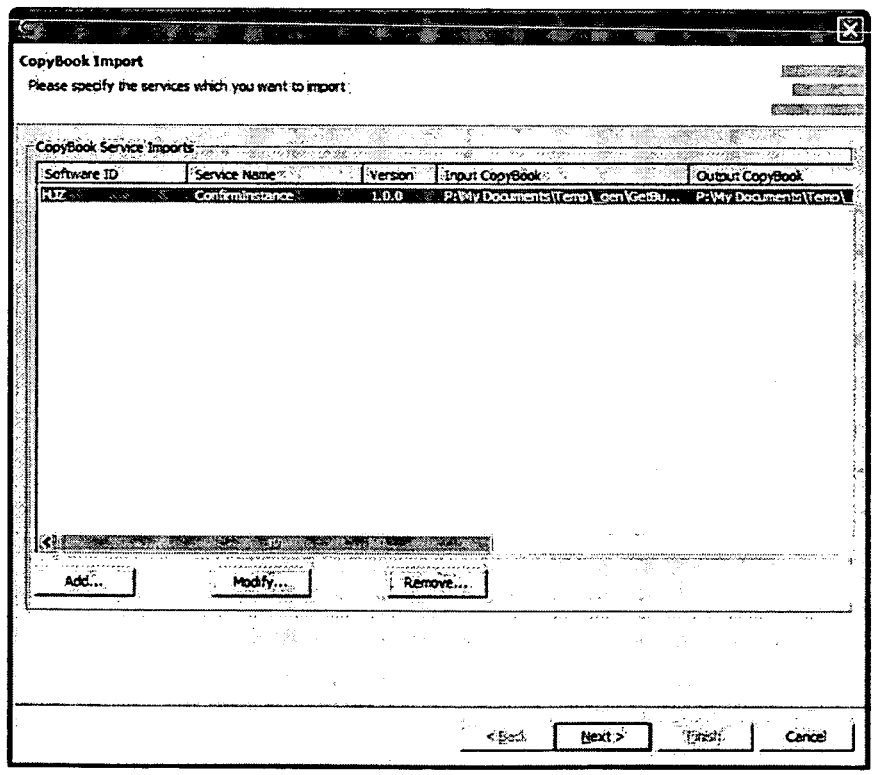
Figure 73:
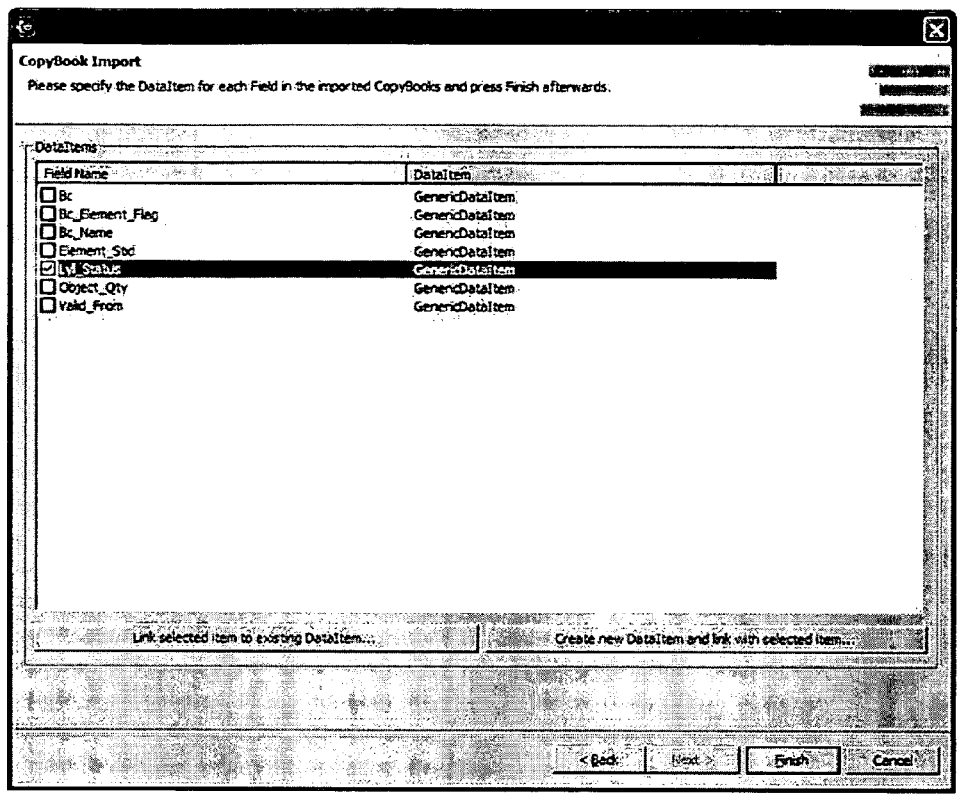

For the input and output copybook files, a file has to be selected (extension is ".cpy" or ".cob") via the user interface of FIG. 70. After setting all fields, the "Import Definition" might look as shown in FIG. 71. Closing this dialog with "OK" will show this particular import as one row in the copybook import dialog (see FIG. 72). As illustrated in FIG. 73, the next task is to assign a data item to every field in the copybooks (by default, all data items are assigned to the "Generic Data Item"). If one or more fields are to be assigned to an existing data item, corresponding steps can be initiated via the "Link selected item(s) to existing Data Items . . . " button, which launches the data item selection dialog. If a new data item is to be created for one or more fields, this can be initiated via the corresponding button of the user interface of FIG. 73. After finishing these assignments, clicking "Finish" will complete the operation and also complete bottom-up generation of the service model.

Regardless of its creation (top-down or bottom-up), the service model and its individual model elements will at least temporarily be stored in the repository database 302 of the system shown in FIG. 3. If a particular artifact is needed, the service model may then at any time be retrieved from the repository database 302 by the generator 304. The generator will then select one or more template files 306 associated with the underlying service type and with the requested artifact type (e.g. a bytecode such as Java™ code) and transform the service model into an artifact under control of the selected template files 306. Accordingly, one and the same model may form the basis for generating different types of artifacts, including code, test cases, and specifications such as a physical description of a service. For each of these types of artifacts, one or more dedicated template files 306 are provided.

In some cases, the generated artifacts may be constructs (or frames) that will have to be manually completed by entering code (e.g. specific application logic) within protected areas of the construct. Such a modeling approach has the advantage that the service model as such is independent of the application logic, which greatly facilitates the re-use of the service model and its model elements. Moreover, amendments to the application logic do not require changes of the underlying service model.

As has become apparent from the above, the provision of the central repository database permits a guided and highly structured creation of service models. It is ensured that previously defined model elements such as complex types and data items can be shared between software developers and software development projects. This sharing increases the re-use of available model elements and thus reduces redundancies in the modeling process.

It should be noted that in larger software development environments, the central repository database may include more than 5.000 services, more than 25.000 complex types, and more than 5.000 data items. From these numbers the advantages of a central repository becomes apparent. The management of service models and model elements in the repository is much easier (and less resource-consuming) than the management of the corresponding physical artifacts. For this purpose, each element (service, complex type, data item) in the repository may be associated with a unique identifier. The identifier facilitates change management and allows for an (automatic) change modification. Each repository element may additionally be associated with a (re-)use indicator. This indicator may serve for repository management, for example with respect to the deletion and/or archiving of elements that have not been used for a certain period of time. Furthermore, authorization profiles may be defined indicating the (re-) usage rights of individual software developers.

The generative software development approach described herein, with a highly structured repository database assisting the creation of service models, represents an advantageous model-driven approach for implementing a SOA, i.e. an architecture communicating via individually executable services, rather than via objects such as in object-oriented (OO) approaches. It will be appreciated by those skilled in the art that the above-described methods and devices can be adapted or extended in various ways. While the foregoing description makes reference to preferred embodiments, the scope of the invention is defined solely by the claims that follow and the elements recited therein.

The invention claimed is:

1. A template-driven system for generating platform-specific artifacts from platform-independent service models, for implementing a service-oriented architecture the system comprising:

a template storage with platform-specific templates, each template including platform-specific model transformation information;

a repository with
   i. a plurality of platform-independent service model elements which are hierarchically structured and
   ii. two or more service models modeled from the service model elements wherein at least some of the service model elements are shared by two or more service models and wherein each service model is modeled from one or more first service model elements of a higher hierarchy level and one or more second service model elements of a lower hierarchy level and wherein an algorithm of a service model is specified by mappings between two or more service model elements; and a generator adapted to generate platform-specific artifacts by applying the platform-specific model transformation information included in the templates to the service models.

2. The system of claim 1, further comprising a service model creator for creating at least one of service model elements and platform-independent service models from the service model elements.

3. The system of claim 2, wherein the service model creator allows for a selection of at least one of a service type and a service publicity.

4. The system of claim 1, wherein in the service model each first model element is associated with one or more second model elements, the one or more second model elements constituting attributes of the first model element.

5. The system of claim 1, wherein the first model elements define at least one of one or more service input parameters and one or more service output parameters.

6. The system of claim 1, wherein the second model elements constitute leaf fields in at least one of a service input parameter tree and a service output parameter tree.

7. The system of claim 1, wherein the service models in the repository are associated with mappings between two or more model elements or between model elements and database tables.

8. The system of claim 7, wherein the mappings define transfer operations between model elements belonging to the same hierarchy level.

9. The system of claim 7, wherein the mappings defines transfer operations between one or more service input parameters and one or more service output parameters.

10. The system of claim 9, wherein the input parameters and output parameters belong to different services.

11. The system of claim 1, further comprising predefined service types that are selectable for service modeling.

12. The system of claim 11, wherein the predefined service types include one or more of a process service, an entity service, a presentation service, a technical service, a batch job and a view.

13. The system of claim 11, wherein the template storage includes at least one dedicated template for each service type.

14. The system of claim 1, further comprising a plurality of predefined platform types.

15. The system of claim 14, wherein the template storage includes at least one dedicated template for each platform type.

16. The system of claim 14, wherein the template storage includes for various combinations of service type and platform type at least one dedicated template.

17. The system of claim 1, wherein the generator allows for a selection of a platform type.

18. The system of claim 1, wherein specific kinds of first service model elements are defined and selectable via a service model creator for service modeling.

19. The system of claim 1, wherein the generated artifacts include at least one of a bytecode, a business-oriented programming language code, Hypertext Markup Language code and eXtensible Markup Language code.

20. A repository database comprising platform-independent model elements which are hierarchically structured and service models modeled from the model elements for implementing a service-oriented architecture, wherein at least some of the service model elements are shared by two or more service models and wherein each service model is modeled from one or more first service model elements of a higher hierarchy level and one or more second service model elements of a lower hierarchy level and wherein an algorithm of a service model is specified by mappings between two or more service model elements and wherein, the service models forming the basis for the generation of platform-specific artifacts under the control of platform-specific templates, each template including platform-specific model transformation information.

21. A method for generating platform-specific artifacts from platform-independent service models for use on a computer, the method comprising:
  providing on the computer one or more first memory portions for storing platform-specific templates, each template including platform-specific model transformation information;
  providing on the computer one or more second memory portions for storing
  i. a plurality of platform-independent service model elements which are hierarchically structured and
  ii. two or more service models modeled from the service model elements wherein at least some of the service model elements are shared by two or more service models and wherein each service model is modeled from one or more first service model elements of a higher hierarchy level and one or more second service model elements of a lower hierarchy level and wherein an algorithm of a service model is specified by mappings between two or more service model elements; and
  generating platform-specific artifacts by applying the platform-specific transformation information included in the templates to the service models.

22. A computer-readable recording medium comprising the platform-specific templates, the plurality of platform-independent service model elements, the two or more service models, and the program code portions for generating the program-specific artifacts of claim 21.

23. A computer for generating platform-specific program code from platform-independent service models, said computer comprising memory for storing:
  (a) a plurality of platform-specific templates, each template including platform specific model transformation information;
  (b) a plurality of platform-independent service model elements which are hierarchically structured;
  (c) two or more service models modeled from the model elements wherein at least some of the service model elements are shared by two or more service models and wherein each service model is modeled from one or more first service model elements of a higher hierarchy level and one or more second service model elements of a lower hierarchy level and wherein an algorithm of a service model is specified by mappings between two or more service model elements; and
  (d) code for generating the platform-specific program code by applying the transformation information included in the templates to the service models.

* * * * *